United States Patent
Sirichai

(10) Patent No.: US 10,076,168 B2
(45) Date of Patent: Sep. 18, 2018

(54) PIVOT PANEL CASE CONSTRUCTION FOR AN ELECTRONIC DEVICE

(71) Applicant: World Richman Manufacturing Corporation, Elgin, IL (US)

(72) Inventor: Saharut Sirichai, Bangkok (TH)

(73) Assignee: WORLD RICHMAN MANUFACTURING CORPORATION, Elgin, IL (US)

(*) Notice: Subject to any disclaimer, the term of this patent is extended or adjusted under 35 U.S.C. 154(b) by 271 days.

(21) Appl. No.: 15/160,102

(22) Filed: May 20, 2016

(65) Prior Publication Data

US 2016/0366997 A1    Dec. 22, 2016

Related U.S. Application Data

(60) Provisional application No. 62/164,365, filed on May 20, 2015.

(51) Int. Cl.

| | |
|---|---|
| *A45C 11/00* | (2006.01) |
| *A45C 13/10* | (2006.01) |
| *F16M 11/10* | (2006.01) |
| *F16M 11/38* | (2006.01) |
| *F16M 13/00* | (2006.01) |
| *F16B 1/00* | (2006.01) |

(52) U.S. Cl.
CPC .......... *A45C 11/00* (2013.01); *A45C 13/1069* (2013.01); *F16M 11/105* (2013.01); *F16M 11/38* (2013.01); *F16M 13/00* (2013.01); *A45C 2011/002* (2013.01); *A45C 2011/003* (2013.01); *A45C 2200/15* (2013.01); *F16B 2001/0035* (2013.01)

(58) Field of Classification Search
USPC .......................... 206/320, 45.2, 45.24, 45.23
See application file for complete search history.

(56) References Cited

U.S. PATENT DOCUMENTS

| | | | |
|---|---|---|---|
| 8,359,078 B2 | 1/2013 | Hung | |
| 8,708,140 B2 * | 4/2014 | Liu | ........................ A45C 11/00 206/320 |
| 8,731,626 B2 | 5/2014 | Hung | |

(Continued)

*Primary Examiner* — Jacob K Ackun
(74) *Attorney, Agent, or Firm* — Christopher J. Scott

(57) ABSTRACT

A case construction selectively encases and displays an electronic device, and includes a device-holding cradle and multi-section panel assembly attachable to the device-holding cradle. The device-holding cradle is sized and shaped to removably receive an electronic device, and provides an anterior device-receiving section and a posterior panel assembly interface. The posterior panel interface includes an anchor portion for attaching the panel assembly thereto and seat portion in adjacency to the anchor portion for allowing dynamic panel portions to rest thereupon. An attachment mechanism operates to attach the multi-section panel assembly to the device-receiving cradle such that a pair of panel portions from the four panel portions are pivotal about a select one of two pivot axes for supporting the device-holding cradle in either a landscape or portrait orientation angled display position relative to a support surface. The pivot axes are enabled by way of flexible material interconnecting opposed panel portions.

18 Claims, 25 Drawing Sheets

(56) References Cited

U.S. PATENT DOCUMENTS

| | | | | |
|---|---|---|---|---|
| 8,746,449 B2* | 6/2014 | Gallagher | F16M 11/105 | 206/320 |
| 8,887,910 B2* | 11/2014 | Ashley | A45C 11/00 | 206/320 |
| 9,000,871 B2* | 4/2015 | Cencioni | G06F 1/1626 | 206/45.2 |
| 9,027,747 B2* | 5/2015 | Hsu | G06F 1/1626 | 206/45.2 |
| 2013/0020216 A1* | 1/2013 | Chiou | G06F 1/1626 | 206/320 |
| 2013/0094134 A1* | 4/2013 | Ashcraft | G06F 1/1615 | 361/679.29 |
| 2013/0233762 A1* | 9/2013 | Balaji | B65D 25/00 | 206/736 |
| 2014/0036438 A1* | 2/2014 | Gioscia | G06F 1/1628 | 361/679.55 |
| 2015/0001105 A1* | 1/2015 | Nyholm | A45C 11/00 | 206/45.2 |
| 2015/0191273 A1* | 7/2015 | Melmon | B65D 5/5206 | 206/45.23 |
| 2015/0296643 A1* | 10/2015 | Lee | A45C 11/00 | 206/45.2 |
| 2017/0338863 A1* | 11/2017 | Del Toro | A45C 11/00 | |

* cited by examiner

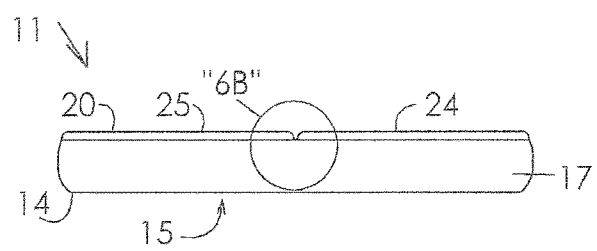
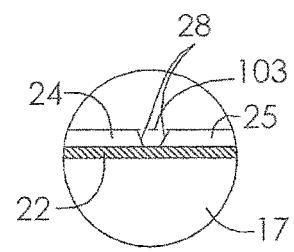
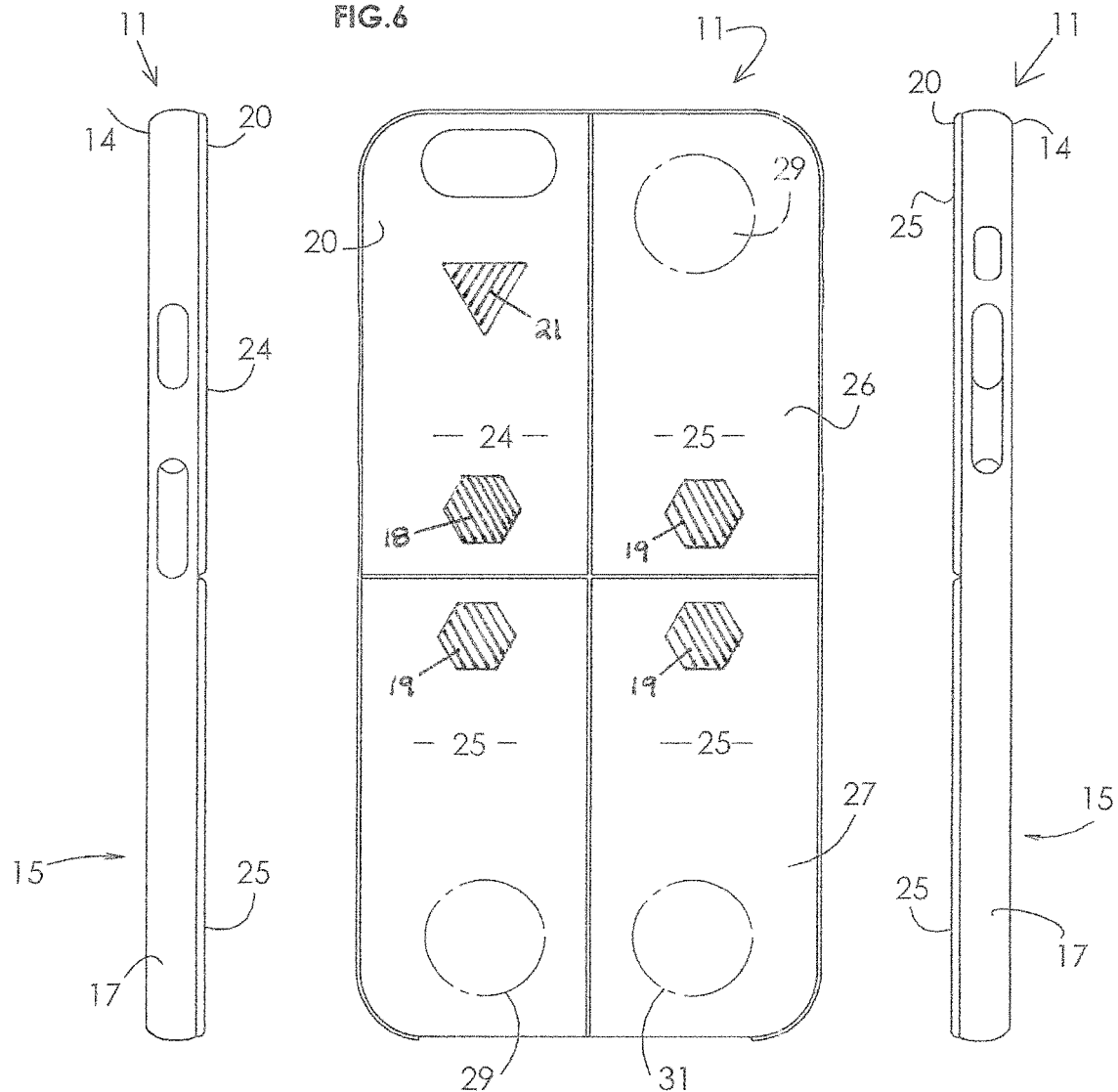

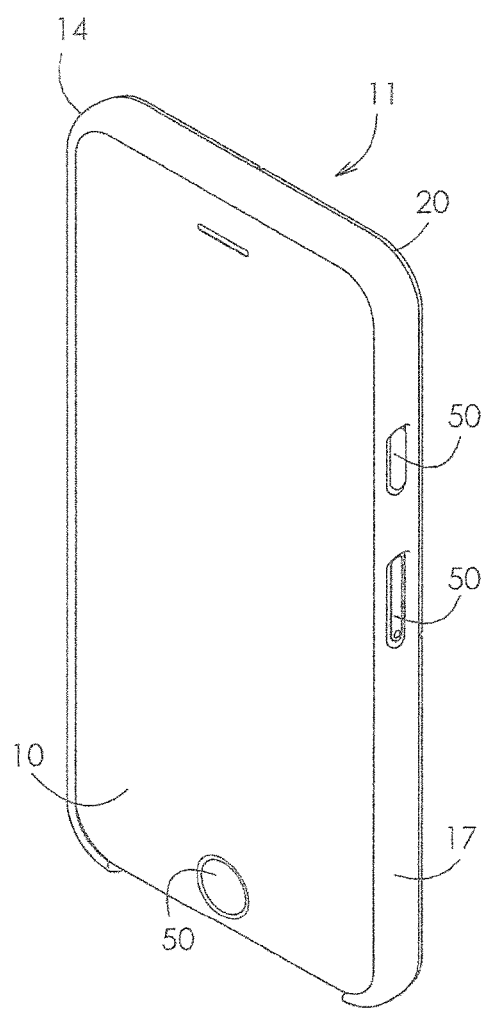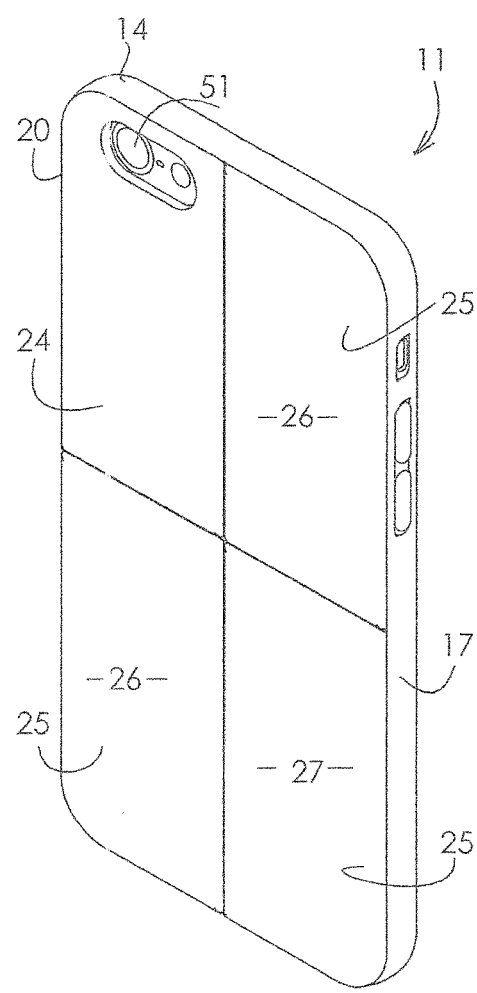
FIG.10
FIG.11

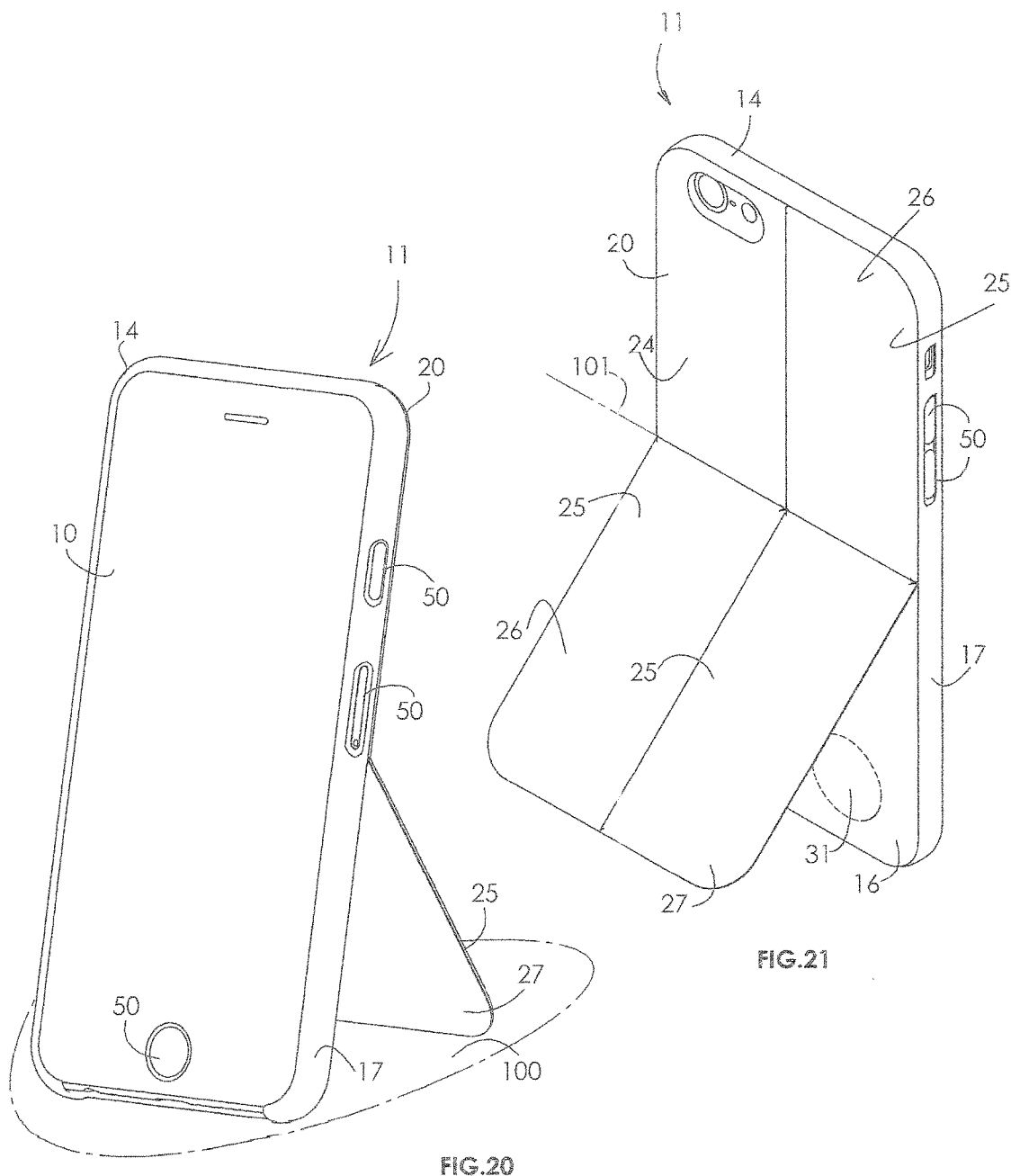

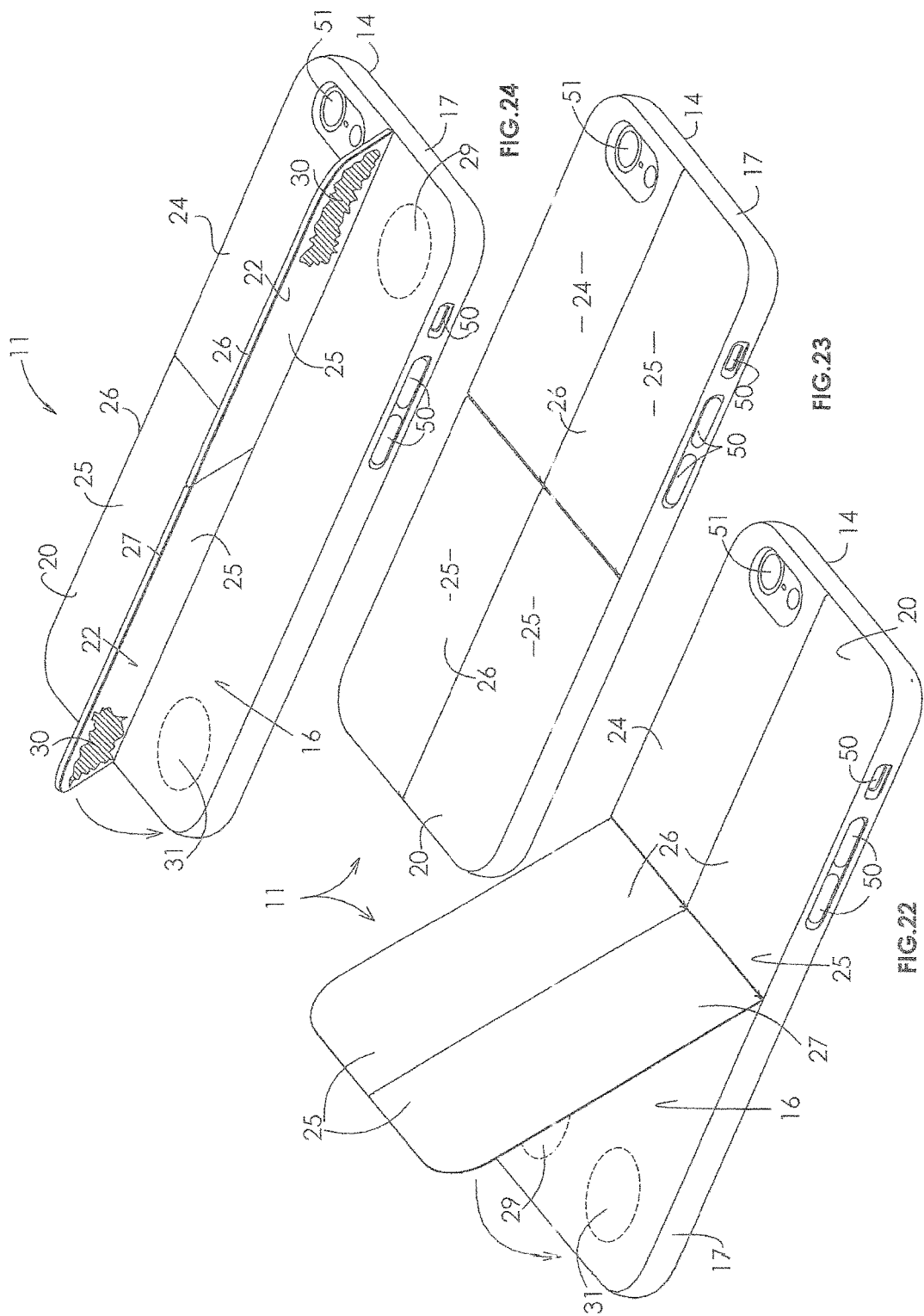

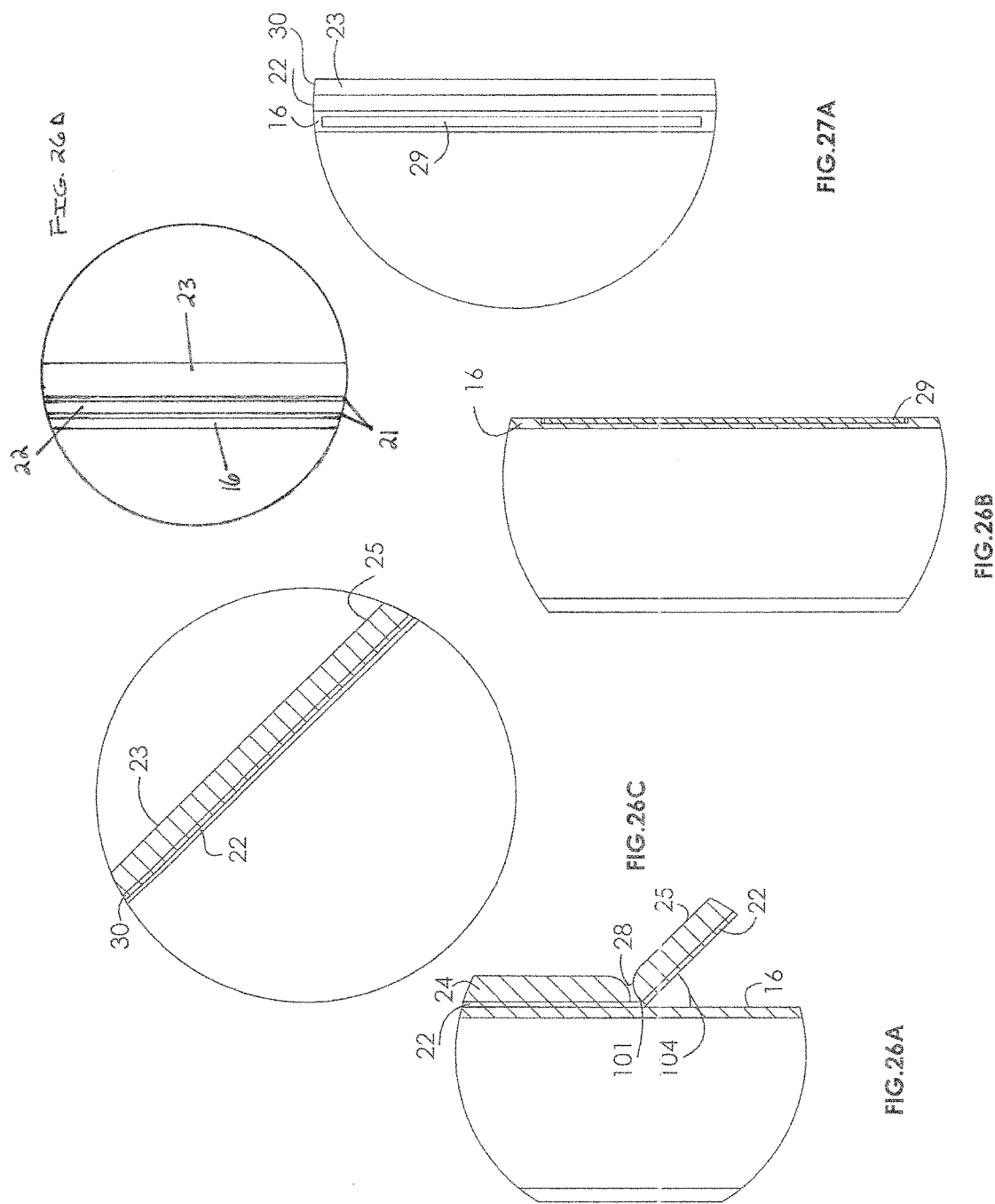

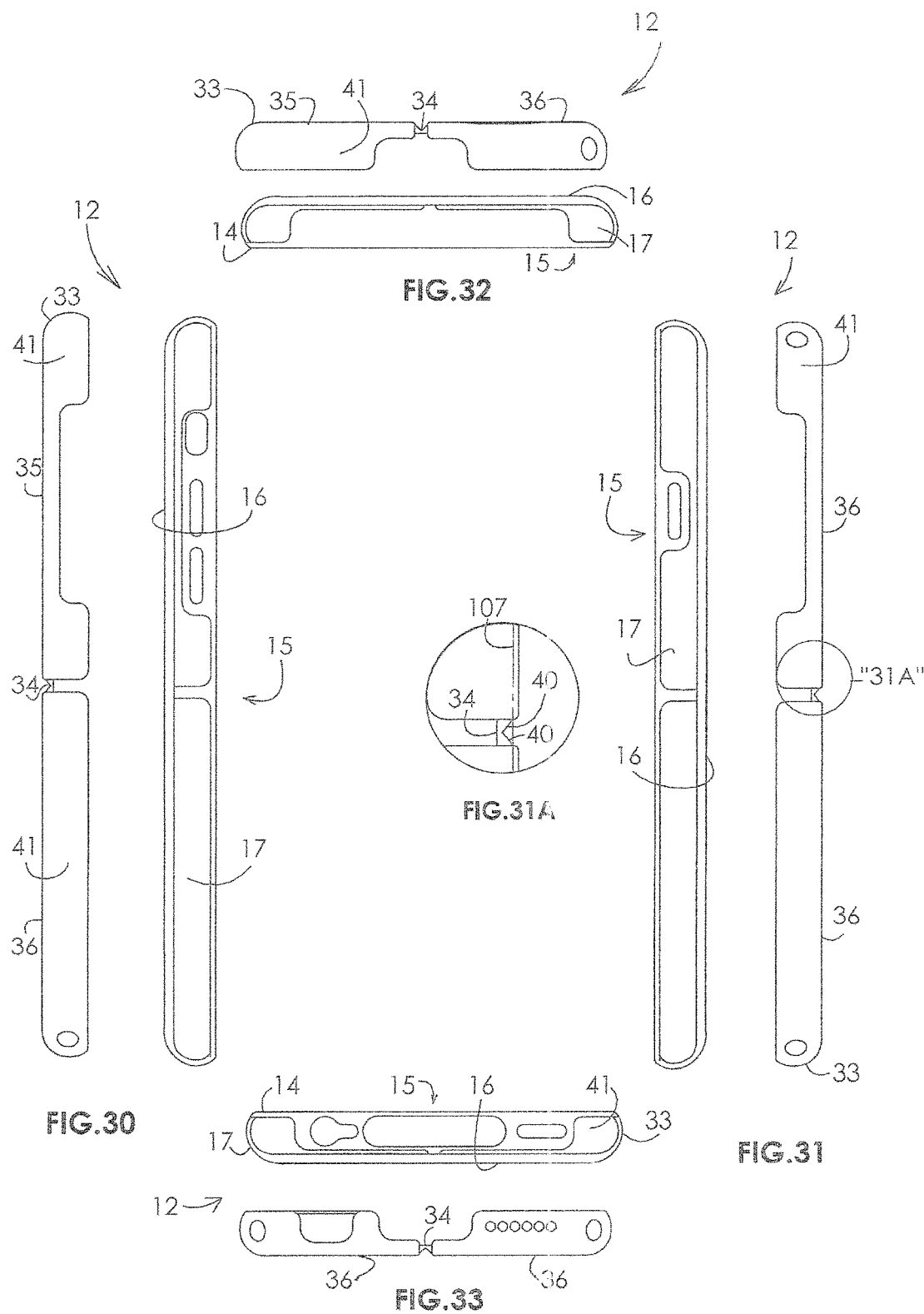

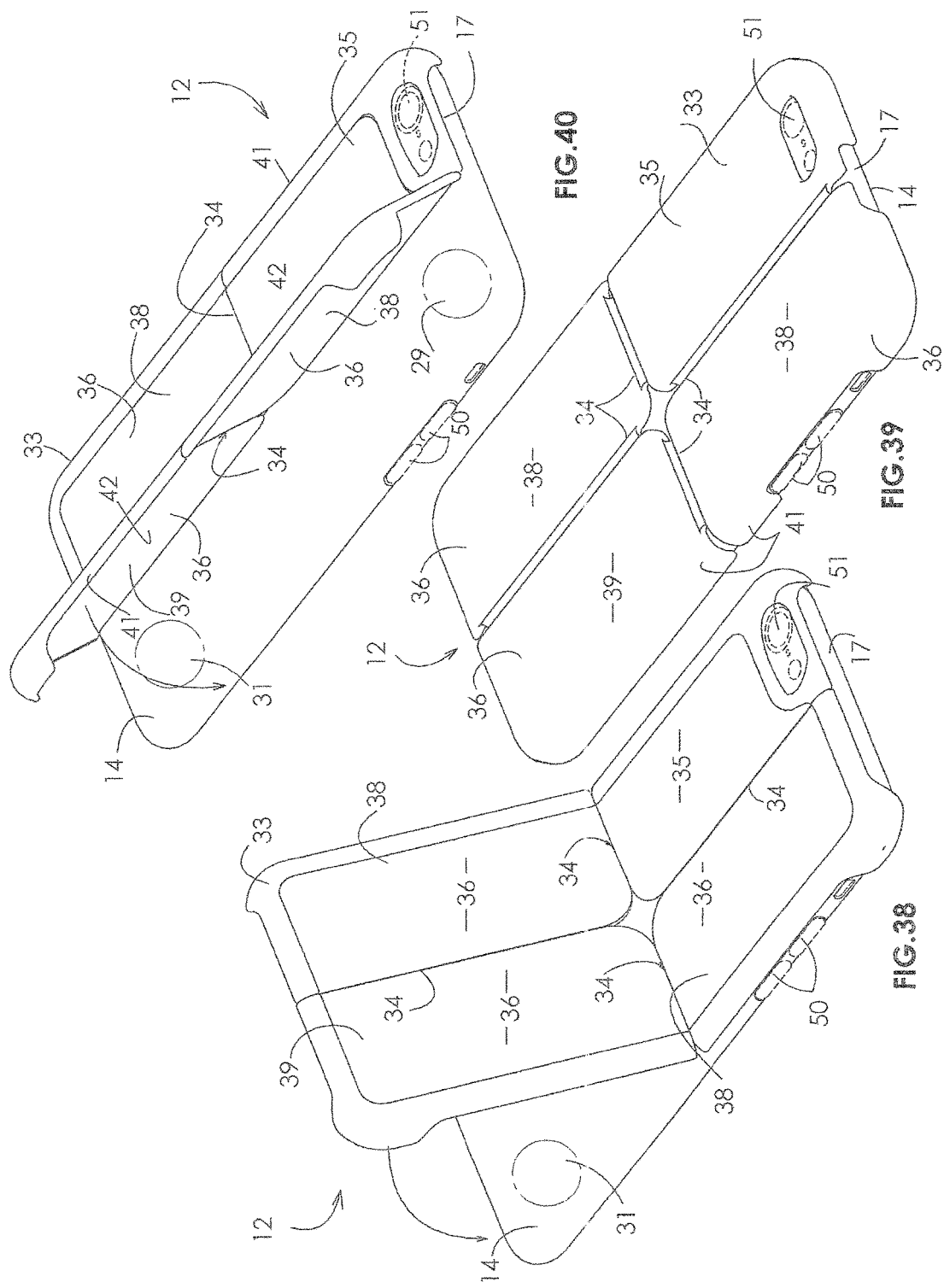

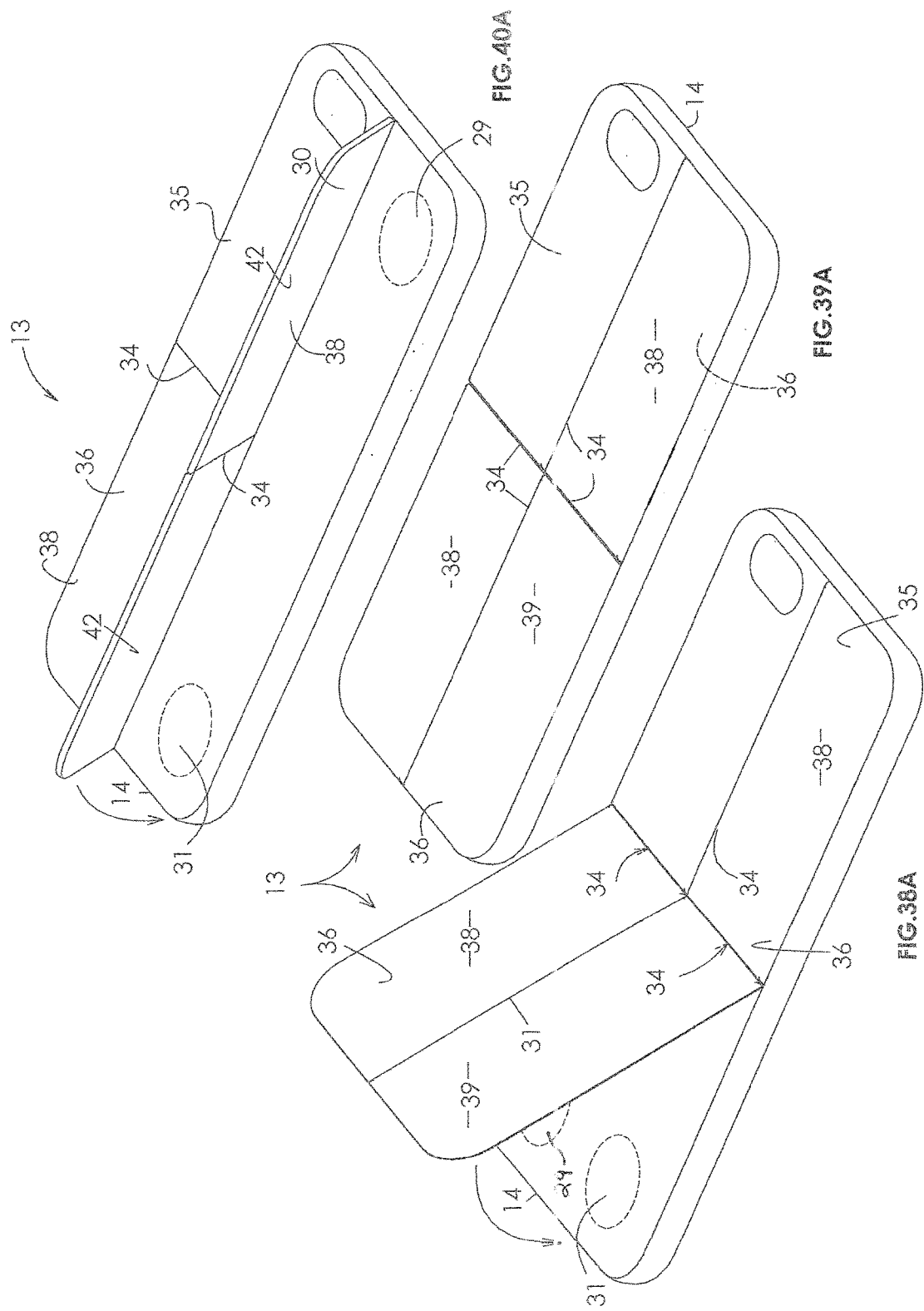

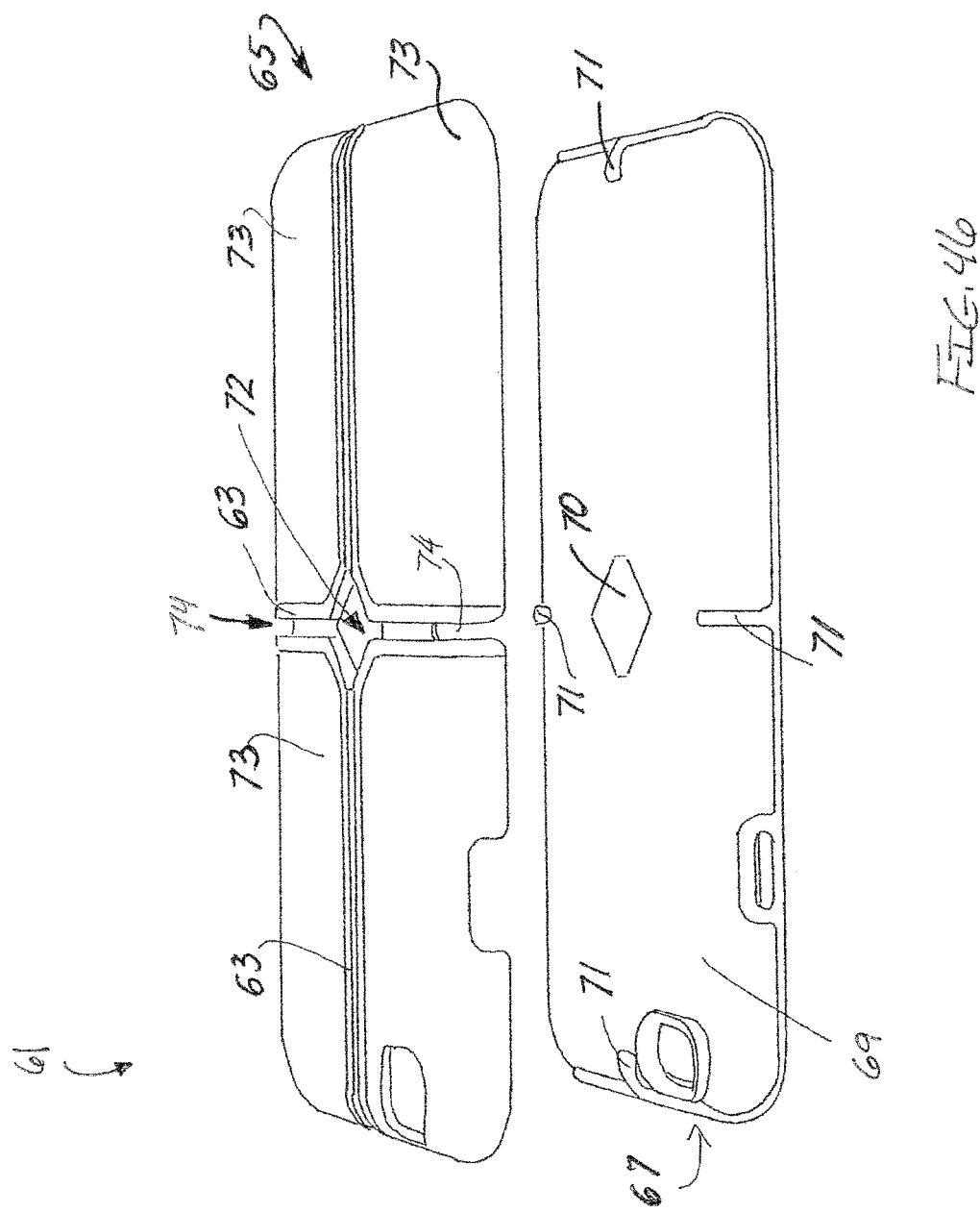

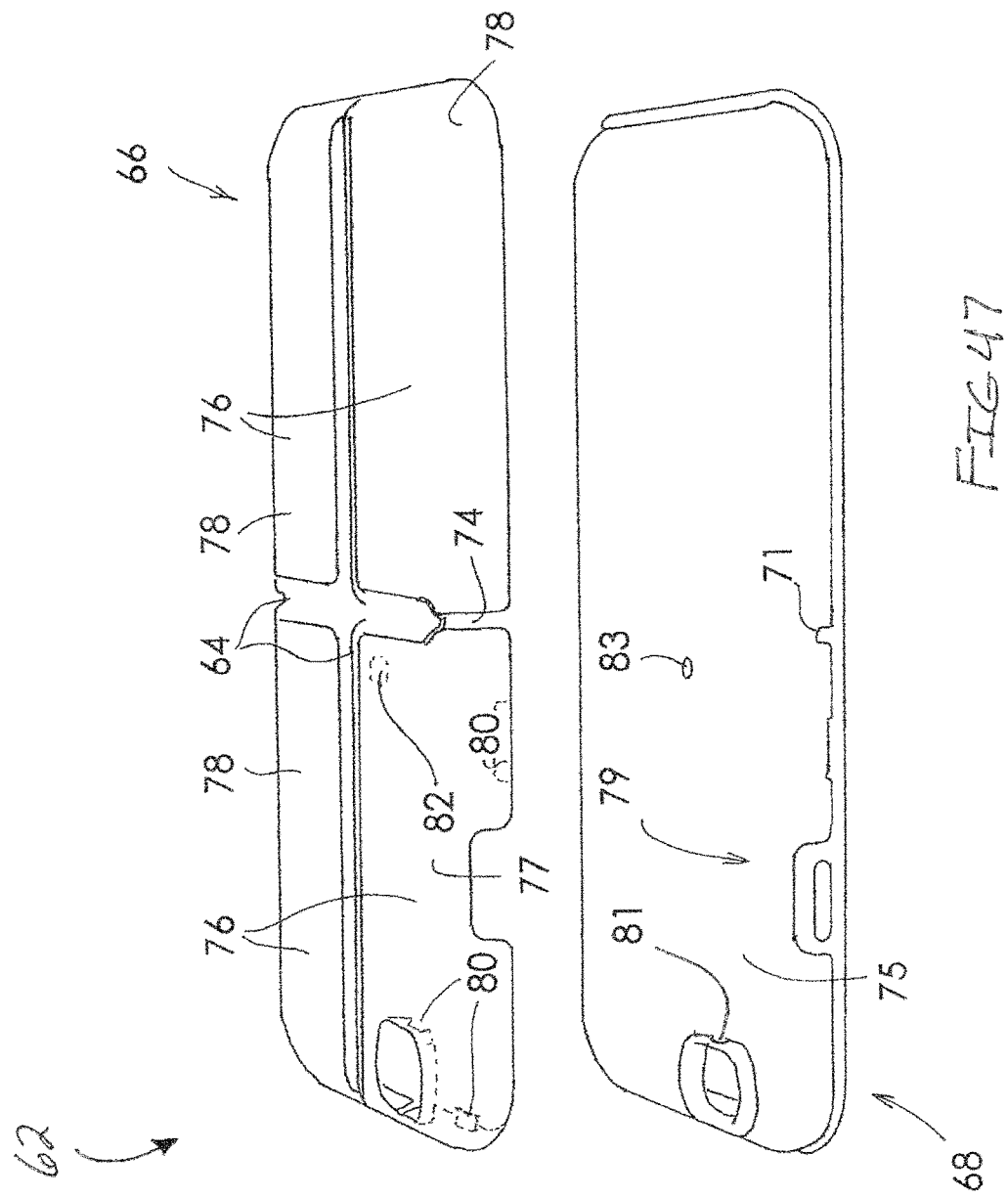

PIVOT PANEL CASE CONSTRUCTION FOR AN ELECTRONIC DEVICE

PRIOR HISTORY

This patent application claims the benefit of U.S. Provisional Patent Application No. 62/164,365 filed in the United States Patent and Trademark Office on 20 May 2015.

BACKGROUND OF THE INVENTION

Field of the Invention

The disclosed invention generally relates to a case construction for encasing an electronic device such as a laptop type computer, tablet type computer, mobile phone or similar other mobile communications device. More particularly, the disclosed invention provides a device-holding case construction with posterior pivot panels for enabling a user to selectively encase an electronic device and/or selectively display the electronic device in either a landscape orientation angled display position or a portrait orientation angled display position.

Brief Description of the Prior Art

Case constructions for use in combination with electronic devices such as tablet type computers and the like are well known in this field of art. While the basic function of a basic case construction is to protect and/or enclose the device it encases, the art continues to develop with an eye toward enhancing functionality of the case constructions so as to provide the user with various means of manipulating and/or re-positioning the devices. Two of the more pertinent prior art patent-related disclosures relating to cradle-like devices for holding and enabling display of the devices they hold are described hereinafter.

U.S. Pat. No. 8,359,078 ('078 Patent) and U.S. Pat. No. 8,731,626 ('626 Patent) authored by Hung and owned by Belkin International, Inc. of Playa Vista Calif. disclose a Mobile Media Device Enclosure, Method of Use of Mobile Media Device Enclosure, and Method of Providing a Mobile Media Device Enclosure. The '078 and '626 Patents describe a mobile media device enclosure or cradle having an interior, an exterior, a top side, a bottom side, a right side, and a left side wherein the interior is configured to form a cavity sized and shaped to retain a mobile media device.

The enclosure further includes both a vertical boundary and a horizontal boundary. The vertical boundary is configured to substantially bisect the mobile media device enclosure from the top side to the bottom side, and the horizontal boundary is configured to substantially bisect the mobile media device enclosure from the left side to the right side. The vertical and horizontal boundaries are thus configured to substantially divide the mobile media device enclosure into four sections, each of which is flexibly and elastically coupled to two other sections of the four sections, and each of which four sections may be temporarily removed from the electronic device.

From a review of the foregoing citations in particular, and from a consideration of the prior art in general, it will be seen that the prior art perceives a need for a pivot panel case construction for enabling a user to removably receive an electronic device as exemplified by a tablet type computer or mobile phone and selectively pivot panels away from a device-holding cradle for propping or supporting the device as received in the cradle in either a landscape or portrait orientation angled display position. Further, the prior art perceives a need for a pivot panel case construction for enabling a user to retain pivotal panels in juxtaposition against posterior surfacing of the device-holding cradle as summarized according to the present invention in more detail hereinafter.

SUMMARY OF THE INVENTION

Among the many objectives of this invention is the basic provision of a case construction for selectively encasing and displaying an electronic device such as tablet type computer or mobile phone. The case construction(s) according to the present invention preferably comprise or include variants of a device-holding mechanism or cradle, and variants of a multi-section panel assembly as attached or anchored to the device-holding mechanism or cradle at an attachment site. The device-holding mechanism or cradle according to the present invention is preferably formed of a moldable material and molded so as to be of a fixed size and shape to removably receive a particularly sized and shaped electronic device and thus serves as an interface of sorts between the received electronic device and the multi-section panel assembly attached thereto.

The device-holding cradle preferably comprises an anterior device-receiving section, a posterior panel-opposing or panel-interfacing section, a peripheral cradle edging, and a cradle length, width, and depth generally dimensioned to receive the external volume of the electronic device. The anterior device-receiving section thus removably receives the electronic device for cradling or jacketing the electronic device and the posterior panel-opposing section comprises a panel assembly attachment portion, with temporary panel seating portions in adjacency thereto. The panel seating portion(s) oppose pivotal sections of the multi-section panel assembly otherwise anchored at the panel assembly attachment portion.

In a first alternative embodiment, a multi-layer, multi-section panel assembly preferably comprises an inner or lower flexible, panel-interconnecting material layer, and an outer or upper substantially rigid, panel-sectioned material layer. The panel-sectioned material layer is attached to the flexible panel-connecting material layer and comprises at least four panel portions, which four panel portions comprise a static panel portion and at least three dynamic panel portions. The flexible material layer at the static panel portion is further permanently attached the permanent panel-attachment portion for anchoring the static panel portion thereto.

In other words, each of the four panel portions are flexibly coupled to at least two other panel portions of the four panel portions via the flexible material layer of the first alternative case construction. A first and a second primary support panel portion of the three dynamic panel portions are pivotal relative to the static panel portion about first and second pivot axes for selectively supporting the device-holding cradle in either a landscape orientation angled display position or a portrait orientation angled display position relative to a support surface.

The first and second primary support panel portions are those dynamic panel portions flexibly connected to the static panel portion. A first secondary support panel portion of the three dynamic panel portions pivots in unison with either of the first or second primary support panel portions for enhancing stabilized support of the device-holding cradle in either of the angled display positions. The first secondary support panel portion is flexibly connected to the first and second primary support panel portions in diagonal relation to the static panel portion.

The case constructions according to the present invention may further preferably comprise or include certain dynamic panel retention means for selectively retaining the dynamic panel portions of the multi-section panel assemblies in engagement with the posterior panel-opposing section of the device-holding cradle for enabling the user to more easily position the device-holding cradle in a flat or prone display position relative to the support surface. In other words, the dynamic panel retention means operate to selectively hold the dynamic panel portions in engagement with the posterior panel-opposing section for enabling the user to more easily lay the case constructions flat upon a surface.

It is contemplated that any number of temporary fastening means may be utilized to perform a dynamic panel retention function, such as hook and loop type fastening means or resilient snap-together type fastening means. In certain preferred embodiments, however, it is contemplated that the dynamic panel retention means may be exemplified by magnetic panel retention means for magnetically attracting the dynamic panel portions toward the posterior panel-opposing portion of the device-holding cradle.

A second case construction essentially differs from the first case construction by providing a unibody multi-section panel assembly having a single layer or material construction with a plurality of panel portions or sections interconnected by integrally formed, living hinges or flexure bearings. Recalling that the multi-section panel assembly of the first case construction comprises a plurality of panels interconnected by a lower flexible, panel-connecting material layer, it will be noted that the living hinges or flexure bearings may be constructed from the same material as the two panel portions each of the living hinges or flexure bearing structures interconnects.

The second case construction according to the present invention may also comprise or include certain dynamic panel retention means for selectively retaining the dynamic panel portions of the multi-section panel assembly in engagement with the posterior panel-opposing section of the cradle for enabling the user to more easily position the device-holding cradle in a flat display position relative to the support surface. In this regard, it is contemplated that the dynamic panel retention means may be preferably exemplified by snap-fit, peripheral panel edging formed to as to resiliently engage the peripheral cradle edging of the device-holding cradle.

The snap-fit, peripheral panel edging is formed to as to resiliently engage the peripheral cradle edging and thereby secondarily cradles the device-holding cradle in much the same manner as the device-holding cradle cradles the electronic device. In this regard, the multi-section panel assembly of the second case construction may be said to provide a cradle jacket to the device-holding cradle, which cradle jacket operates to both protect the device-holding cradle and also enable the user to prop or support the device-holding cradle in either of the angled display positions.

A third case construction essentially differs from the second case construction by providing the multi-section panel assembly without the peripheral panel edging, and thus in the third case construction, other dynamic panel retention means, such as the magnetic panel retention means may be the preferred panel retention means substantially as previously summarized for magnetically attracting the dynamic panel portions toward the posterior panel-opposing portion.

Fourth and fifth case constructions according to the present invention are further contemplated and in both case constructions, co-molded elastomeric-polycarbonate flexure bearing or hinge structures respectively and flexibly interconnect opposed polycarbonate panel portions of multi-section panel assemblies, which assemblies cooperate with certain device-holding cradles for selectively encasing and displaying an electronic device.

In the fourth alternative embodiment, a device-holding cradle is provided to comprise or include a differing posterior panel-opposing section that features the addition of a hub member and a series of rib members that extend rearwardly from the posterior panel-opposing. In this case construction, the flexure bearing or hinge structure of the multi-section panel assembly provides or defines a hub-receiving aperture. The hub member extends rearwardly and is thus received in the cooperatively shaped hub-receiving aperture for enhancing attachment and positioned placement of the multi-section panel assembly to the device-holding cradle.

The multi-section panel assembly preferably comprises a series of at least four panel portions, which four panel portions are flexibly coupled to one another via the hinge structure(s). The cooperative association of the hub member and hub-receiving aperture operates to help attach the multi-section panel assembly to the device-receiving cradle such that a pair of panel portions from the four panel portions are pivotal about a select one of two pivot axes for supporting the device-holding cradle in a select angled display position relative to a support surface.

The assembly-to-cradle attachment mechanism according to the fourth alternative embodiment provides certain alternative panel retention means and may be further exemplified by comprising a series of rib-receiving slots formed in the multi-section panel assembly. In this regard, the rib members are receivable in the rib-receiving slots for also enhancing attachment and positioned placement of the multi-section panel assembly relative to the device-holding cradle. Notably, the four panel portions are hingedly and flexibly interconnected via the flexure bearing or hinge structure(s), which flexure bearing or hinge structure(s) are preferably abbreviated in length relative to the corresponding length of opposed panel portions hingedly and flexibly interconnected thereby for forming the rib-receiving slots.

With regard to the fifth case construction according to the present invention, the device-holding cradle comprises or provides a unique posterior panel-opposing section that differs from other cradles at least insofar as the addition of certain matable male and/or female structures for mating with corresponding structures formed on the multi-section panel assembly usable in combination therewith to form the fifth case construction. The assembly-to-cradle attachment mechanism of the fifth case construction is defined, in part, by the cooperative association of the matable elements formed on the panel assembly and the cradle.

In this regard, the four panel portions again comprise a static panel portion and three dynamic panel portions. The static panel portion is preferably anchored to a panel attachment site or portion of the posterior panel-opposing section via the assembly-to-cradle attachment mechanism defined by matable structures. Thus, a first primary support panel portion and a second primary support panel portion of the three dynamic panel portions are pivotal relative to the static panel portion about the first and second pivot axes for selectively supporting the device-holding cradle in the select angled display position relative to a support surface.

Other objects of the present invention, as well as particular features, elements, and advantages thereof, will be elucidated or become apparent from, the following description and the accompanying drawing figures.

BRIEF DESCRIPTION OF THE DRAWINGS

Other features and objectives of the invention will become more evident from a consideration of the following brief descriptions of patent drawings:

FIG. 3 is a first lateral edge view of the first alternative pivot panel case construction according to the present invention showing the multi-section panel assembly attached to the device-holding cradle in a closed configuration.

FIG. 4 is a second posterior view of the first alternative pivot panel case construction according to the present invention showing a multi-section panel assembly attached to the device-holding cradle with hidden magnet members being depicted in broken lines; hexagonally-shaped breakaway portions to show otherwise hidden cradle structure; and a triangular-shaped breakaway portion to show an otherwise hidden adhesive layer.

FIG. 5 is a second lateral edge view of the first alternative pivot panel case construction according to the present invention showing the multi-section panel assembly attached to the device-holding cradle in a closed configuration.

FIG. 6 is a top edge view of the first alternative pivot panel case construction according to the present invention showing the multi-section panel assembly attached to the device-holding cradle in a closed configuration.

FIG. 6B is an fragmentary, enlarged sectional view as enlarged and sectioned from FIG. 6 to show in greater detail a pivot panel junction site of the multi-section panel assembly.

FIG. 7 is a bottom edge view of the first alternative pivot panel case construction according to the present invention showing the multi-section panel assembly attached to the device-holding cradle in a closed configuration.

FIG. 10 is a second top anterior perspective view of the first alternative pivot panel case construction according to the present invention with an electronic device received in the device-holding cradle.

FIG. 11 is a second top posterior perspective view of the first alternative pivot panel case construction according to the present invention with an electronic device received in the device-holding cradle.

FIG. 20 is a sixth top anterior perspective view of the first alternative pivot panel case construction according to the present invention with an electronic device received in the device-holding cradle and shown in a portrait orientation open-pivot configuration.

FIG. 21 is a sixth top posterior perspective view of the first alternative pivot panel case construction according to the present invention with an electronic device received in the device-holding cradle and shown in a portrait orientation open-pivot configuration.

FIG. 22 is a posterior perspective view of the first alternative pivot panel case construction according to the present invention with an electronic device received in the device-holding cradle and shown in an open-pivot configuration about a first pivot axis.

FIG. 23 is a posterior perspective view of the first alternative pivot panel case construction according to the present invention with an electronic device received in the device-holding cradle and shown in a closed configuration.

FIG. 24 is a posterior perspective view of the first alternative pivot panel case construction according to the present invention with an electronic device received in the device-holding cradle and shown in an open-pivot configuration about a second pivot axis.

FIG. 26A is an enlarged, fragmentary sectional view as sectioned from FIG. 26 enlarged to show in greater detail the pivot junction site of the multi-section panel assembly.

FIG. 26B is an enlarged, fragmentary sectional view as sectioned from FIG. 26 enlarged to show in greater detail the magnet embedded structure of the device-holding cradle.

FIG. 26C is an enlarged, fragmentary sectional view as sectioned from FIG. 26 enlarged to show in greater detail the multi-layer structure of the multi-section panel assembly.

FIG. 26D is an enlarged, fragmentary sectional view as sectioned from FIG. 26 enlarged to show in greater detail the multi-layer structure of the multi-section panel assembly as adhesively anchored to the static panel portion of the device-holding cradle.

FIG. 27A is an enlarged, fragmentary sectional view as sectioned from FIG. 27 enlarged to show in greater detail the multi-layer structure of the multi-section panel assembly in juxtaposition with the magnet embedded structure of the device-holding cradle.

FIG. 30 is an exploded first lateral edge view of the second alternative pivot panel case construction according to the present invention showing the multi-section panel assembly exploded from the device-holding cradle in a closed configuration.

FIG. 31 is an exploded second lateral edge view of the second alternative pivot panel case construction according to the present invention showing the multi-section panel assembly exploded from the device-holding cradle in the closed configuration.

FIG. 31A is an enlarged, fragmentary sectional view of the flexure bearing structure junction site intermediate opposed panel portions of the multi-section panel assembly as sectioned from FIG. 31.

FIG. 32 is an exploded top edge view of the second alternative pivot panel case construction according to the present invention showing the multi-section panel assembly exploded from the device-holding cradle in the closed configuration.

FIG. 33 is an exploded bottom edge view of the second alternative pivot panel case construction according to the present invention showing the multi-section panel assembly exploded from the device-holding cradle in the closed configuration.

FIG. 38 is a third posterior perspective view of the second alternative pivot panel case construction according to the present invention shown in a third open, portrait type case configuration.

FIG. 39 is a fourth posterior perspective view of the second alternative pivot panel case construction according to the present invention shown in a closed case configuration.

FIG. 40 is a fifth posterior perspective view of the second alternative pivot panel case construction according to the present invention shown in a fourth open, landscape type case configuration.

FIG. 38A is a first posterior perspective view of a third alternative pivot panel case construction according to the present invention shown in a first open, portrait type case configuration.

FIG. 39A is a second posterior perspective view of the third alternative pivot panel case construction according to the present invention shown in a closed case configuration.

FIG. 40A is a third posterior perspective view of the third alternative pivot panel case construction according to the present invention shown in a second open, landscape type case configuration.

FIG. 46 is an exploded posterior perspective view of the fourth alternative pivot panel case construction according to the present invention with the upper multi-section panel assembly being exploded from the lower device-receiving cradle.

FIG. 47 is an exploded posterior perspective view of a fifth alternative pivot panel case construction according to the present invention with the upper multi-section panel assembly being exploded from the lower device-receiving cradle.

DETAILED DESCRIPTION OF THE PREFERRED EMBODIMENTS

Figure 2:
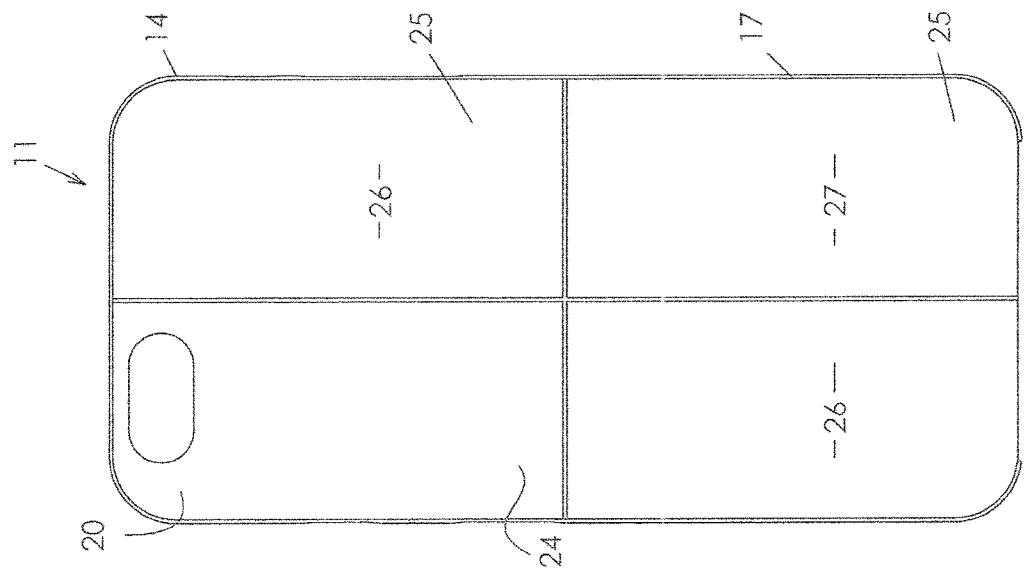
FIG. 2 is a first posterior view of the first alternative pivot panel case construction according to the present invention showing a multi-section panel assembly attached to the device-holding cradle.
Figure 1:
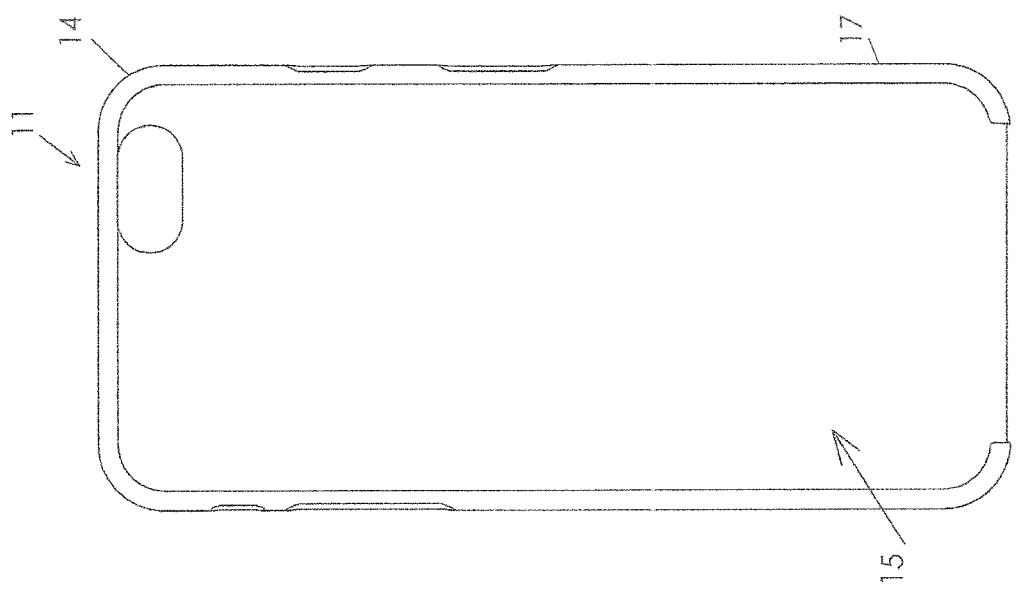
FIG. 1 is a first anterior view of a first alternative pivot panel case construction according to the present invention showing a device-holding cradle.
Figure 8:
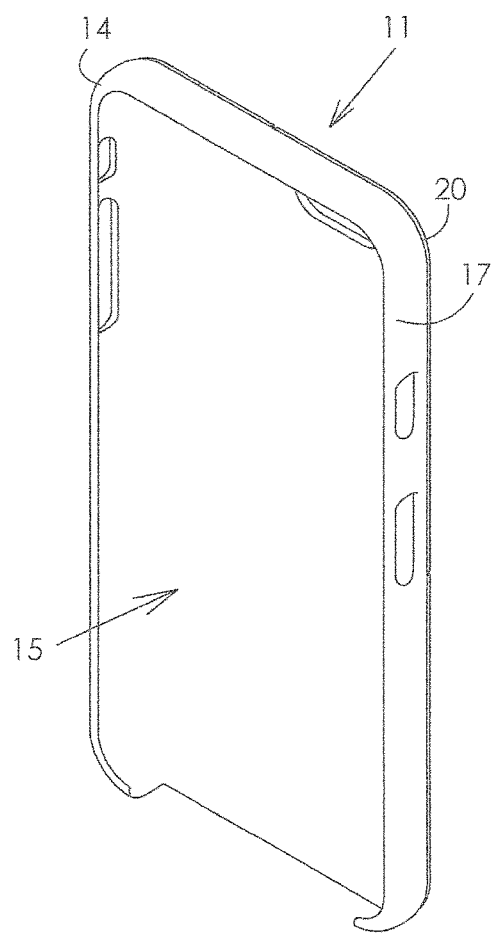
FIG. 8 is a first top anterior perspective view of the first alternative pivot panel case construction according to the present invention showing the multi-section panel assembly attached to the device-holding cradle in a closed configuration.
Figure 9:
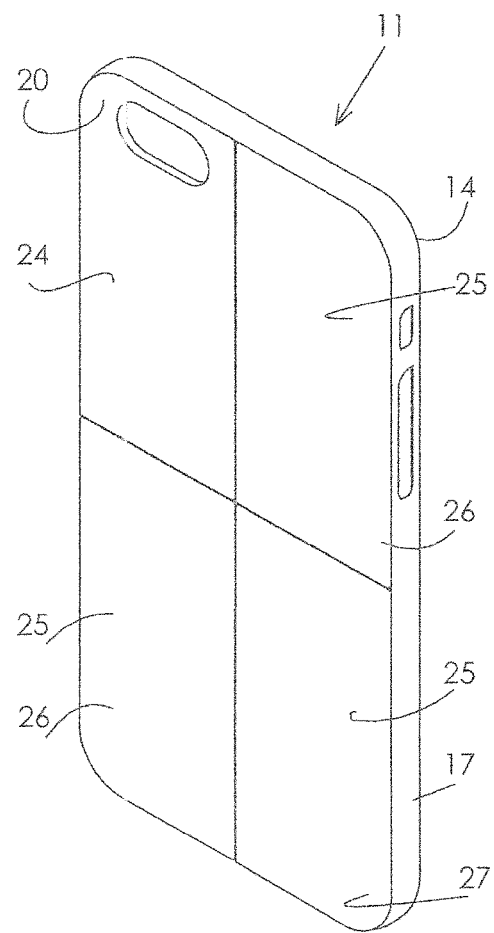
FIG. 9 is a first top posterior perspective view of the first alternative pivot panel case construction according to the present invention showing the multi-section panel assembly attached to the device-holding cradle in a closed configuration.
Figure 12:
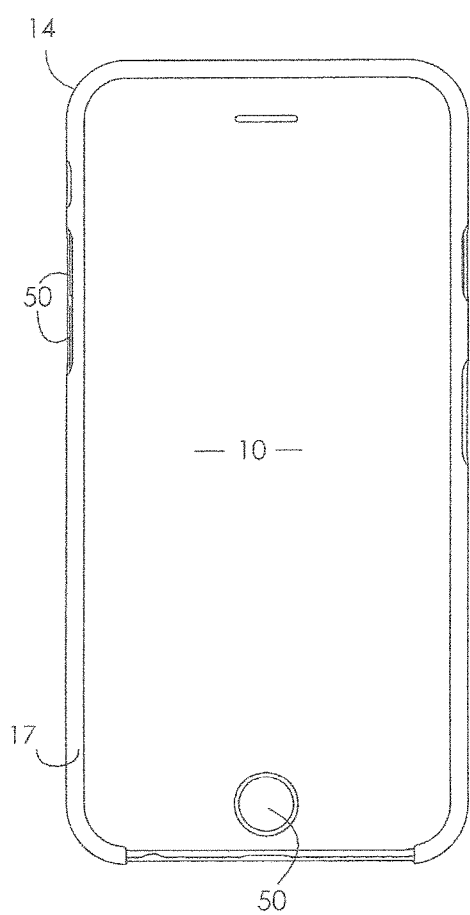
FIG. 12 is a second anterior view of a first alternative pivot panel case construction according to the present invention with an electronic device received in the device-holding cradle.
Figure 13:
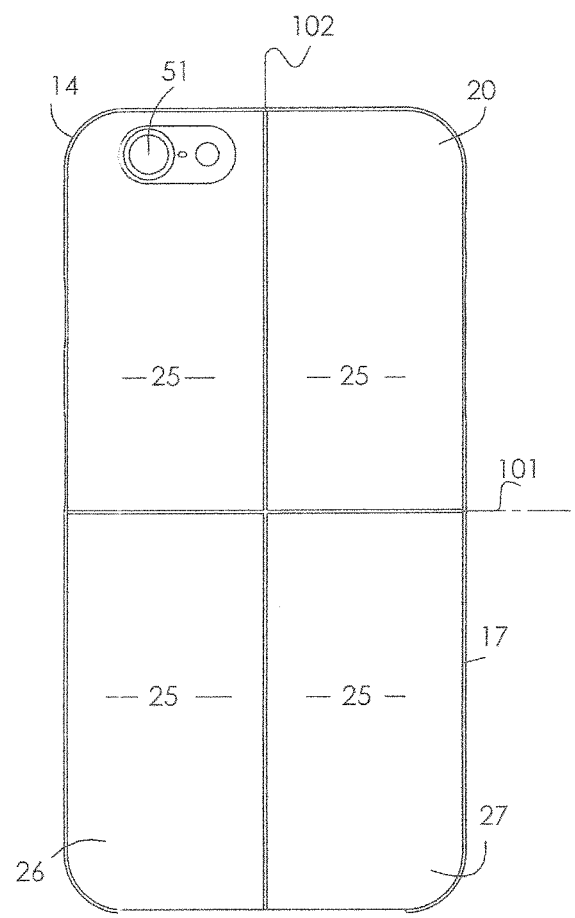
FIG. 13 is a second posterior view of the first alternative pivot panel case construction according to the present invention showing a multi-section panel assembly attached to the device-holding cradle with an electronic device received in the device-holding cradle.

Referring now to the drawings with more specificity, the present invention preferably provides a case construction, as variously exemplified and referenced at 11, 12, 13, 61, and 62 for selectively encasing and displaying an electronic device as at 10. The case constructions 11, 12, and 13 according to the present invention all preferably comprise or include a device-holding mechanism or cradle as at 14, and variants of a multi-section panel assembly as attached to the device-holding mechanism or cradle 14 at a permanent panel attachment site. The case constructions 61 and 62 comprise slightly modified cradles 67 and 68 respectively as compared to cradle 14.

The device-holding mechanism or cradle 14 according to the present invention is preferably formed of a moldable material and molded so as to be of a fixed size and shape to removably receive a particularly sized and shaped electronic device 10. In other words, the inner volume defined by the anterior-device receiving section 15 or cavity of the device-holding cradle 14 is configured so as to generally and cooperatively receive the external volume of the electronic device 10 while allowing the user to interact with or utilize input/output means of the device 10 such as a touch screen, buttons as at 50, or a camera lens as at 51.

As indicated, the device-holding cradle 14 preferably comprises an anterior device-receiving section as at 15, a posterior panel-opposing or panel-interfacing section as at 16, a peripheral cradle edging as at 17, and a cradle length, width, and depth generally dimensioned to receive the external volume of the electronic device 10. The anterior device-receiving section 15 thereby removably receives the electronic device 10 for cradling or jacketing the electronic device 10. The posterior panel-opposing section 16 comprises a permanent panel-attachment portion as at 18, and a temporary panel-attachment portion as at 19.

Figure 26:
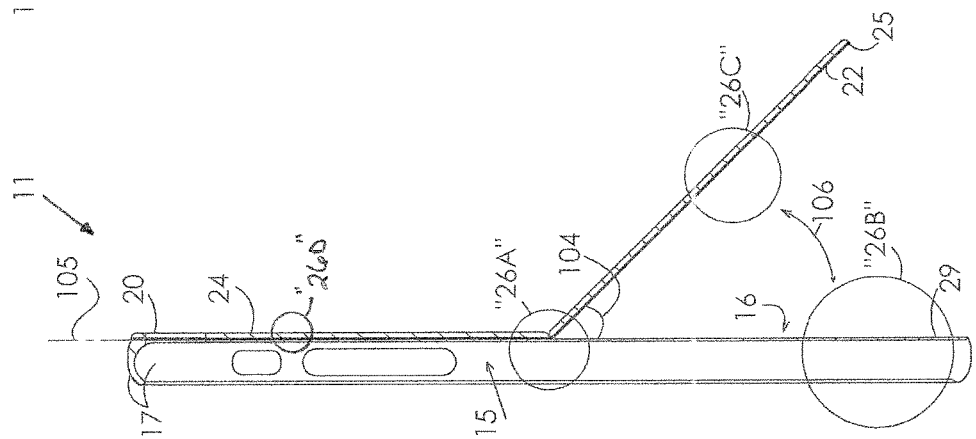
FIG. 26 is a longitudinal cross-sectional view of the first alternative pivot panel case construction according to the present invention as sectioned from FIG. 25 and shown in an open-pivot configuration about the first pivot axis.
Figure 25:
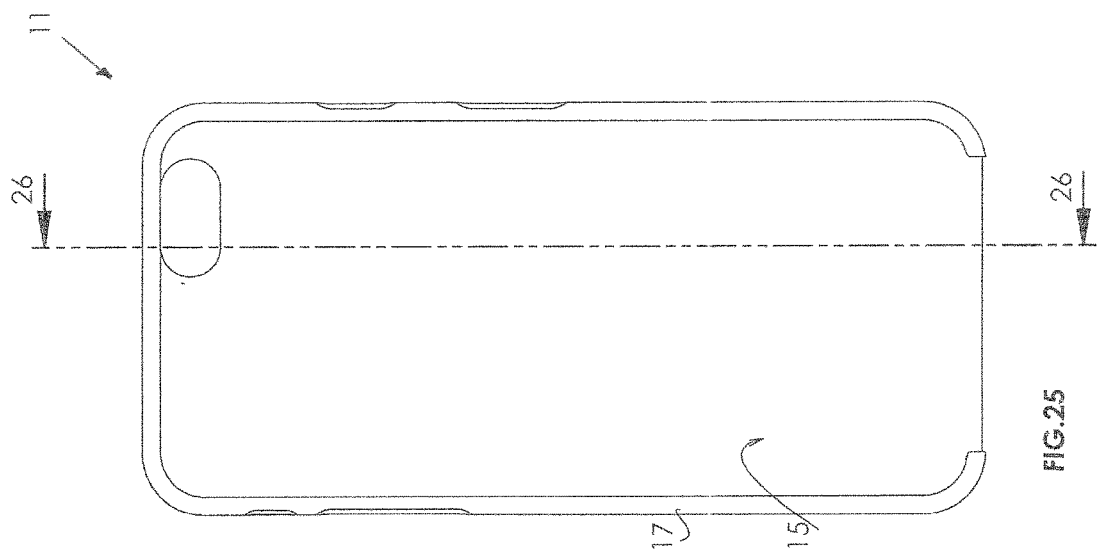
FIG. 25 is a third anterior view of the first alternative pivot panel case construction according to the present invention showing a device-holding cradle.
Figure 29:
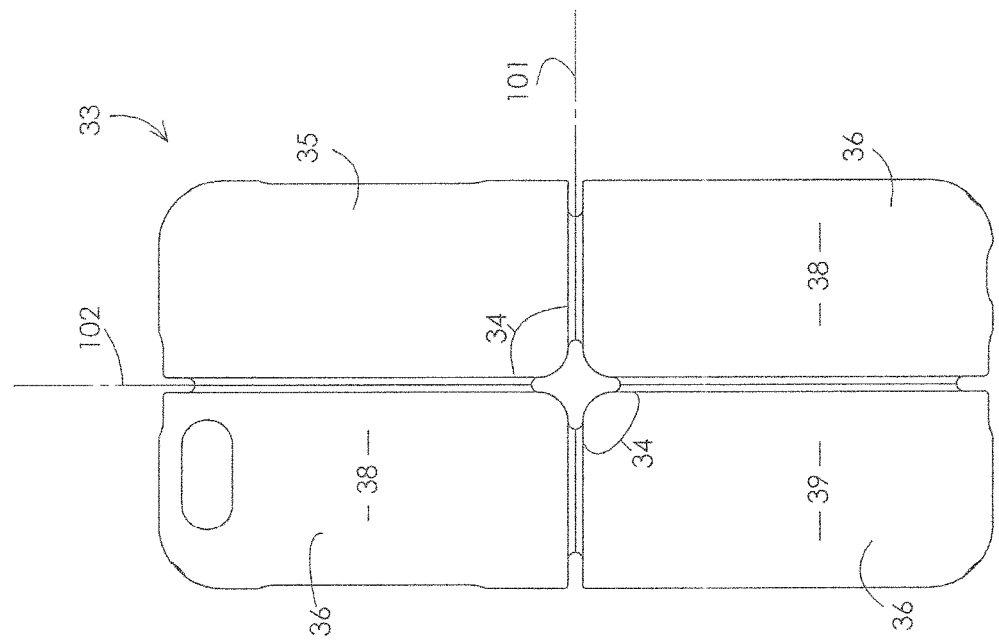
FIG. 29 is a posterior plan view of the second alternative multi-section panel assembly of the second alternative pivot panel case construction according to the present invention.

The permanent panel-attachment portion 18 is referenced in FIG. 4 at a hexagonally-shaped breakaway to show otherwise hidden structure and is exemplified as a single quadrant of a four-quadrant posterior panel-opposing section 16. Further, the temporary panel-attachment portion 19 is referenced in FIG. 4 at hexagonally-shaped breakaways to show otherwise hidden structure and is an L-shaped, three-quadrant combination of the four-quadrant posterior panel-opposing section 16. The permanent panel-attachment portion 18 is the site of attachment for the multi-layer, multi-section panel assembly 20. In the first alternative embodiment or case construction 11, the multi-layer, multi-section panel assembly 20 is adhered to the permanent panel-attachment portion 18 via an adhesive layer as generally depicted and referenced at triangular-shaped breakaway 21. Adhesive layers 21 are also depicted and referenced in FIG. 26D.

The multi-layer, multi-section panel assembly 20 of case construction 11 preferably comprises an inner or lower flexible, panel-connecting material layer as at 22, and an outer or upper substantially rigid (or load-supportive), panel-sectioned material layer as at 23. The panel-sectioned material layer 23 is (adhesively) attached to the flexible panel-connecting material layer 22 and comprises at least four panel portions, which four panel portions comprise a static panel portion as at 24 and at least three dynamic panel portions as at 25. The flexible material layer 22 at the static panel portion 24 is further permanently attached the permanent panel-attachment portion 18 via an adhesive layer 21 for anchoring the static panel portion 24 thereto.

Each of the four panel portions 24 and 25 are flexibly coupled to at least two other panel portions of the four panel portions via the flexible material layer 22 in case construction 11. A first primary support panel portion 26 and a second primary support panel portion 26 of the three dynamic panel portions 25 are pivotal relative to the static panel portion 24 about first and second pivot axes 101 and 102 for selectively supporting the device-holding cradle 14 in either a portrait orientation angled display position or a landscape orientation angled display position relative to a support surface 100 as generally depicted in FIGS. 14-21.

Figure 14:
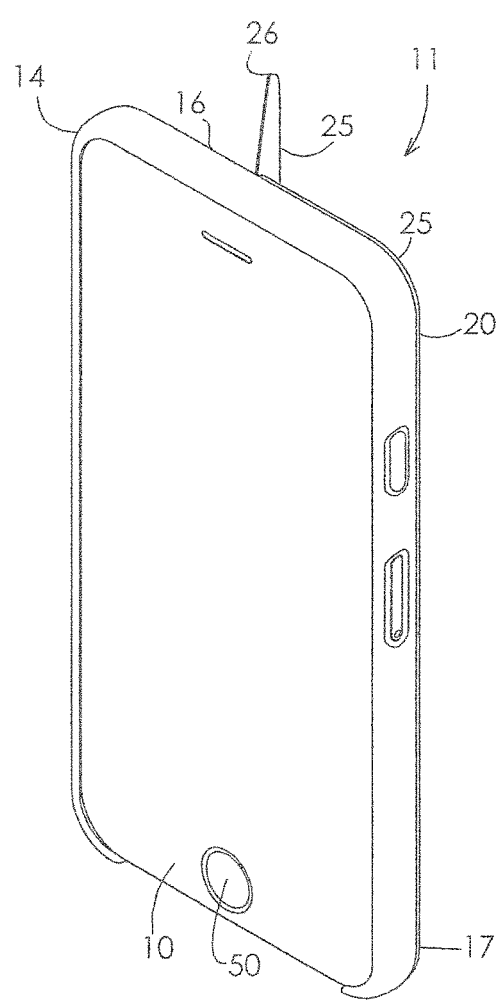
FIG. 14 is a third top anterior perspective view of the first alternative pivot panel case construction according to the present invention with an electronic device received in the device-holding cradle and shown in a portrait orientation open-pivot configuration.
Figure 15:
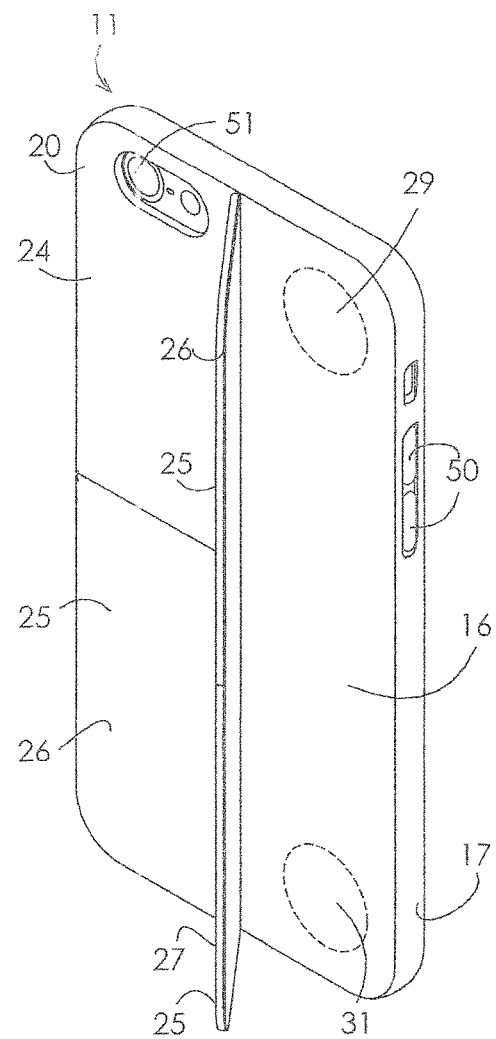
FIG. 15 is a third top posterior perspective view of the first alternative pivot panel case construction according to the present invention with an electronic device received in the device-holding cradle and shown in a portrait orientation open-pivot configuration.

The portrait orientation angled display position is enabled when dynamic panel portions are pivoted about axis 101 and the landscape orientation angled display position is enabled when dynamic panel portions are pivoted about axis 102. Notably, however, a portrait orientation substantially vertical display position is also enabled when dynamic panel portions are pivoted about axis 102 as generally depicted in FIGS. 14 and 15; and a landscape orientation, substantially vertical display position is also enabled when dynamic panel portions are pivoted about axis 101 (not specifically illustrated).

The first and second primary support panel portions 26 are those dynamic panel portions 25 flexibly connected to the static panel portion 24. A first secondary support panel portion 27 of the three dynamic panel portions 25 pivots in unison with either of the first or second primary support panel portions 26 for enhancing stabilized support of the device-holding cradle 14 in either of the angled display positions. The first secondary support panel portion 27 is flexibly connected to the first and second primary support panel portions 26 in diagonal relation to the static panel portion 24.

The first primary support panel portion 26 and the second primary support panel portion 26 are preferably spaced from the static panel portion 24 at an upper surface plane 103 thereof such that opposed panel edging 28 of the static and dynamic panel portions 24 and 25 engage one another when in either of the angled display positions for enhancing stabilized support of the device-holding cradle 14 in the angled display position. Similarly, the first secondary support panel portion 27 is preferably spaced from the first and second primary support panel portions 26 such that opposed panel edging 28 of the dynamic panel portions 25 engage one another when in the angled display position for enhancing stabilized support of the device-holding cradle 14 in either of the angled display positions.

The opposed panel edging 28 is preferably obliquely angled relative to the plane 103 of the outer panel surfacing of the multi-layer, multi-section panel assembly 20. Comparatively referencing FIGS. 26 and 26A, the reader will there consider that the obliquely angled opposed panel edging 28 operates to fix the display angle 104 of either of the angled display positions relative to the support surface 100. In other words, differing angles at edging 28 will operate to vary the display angle 104 of the angled display position. The edging 28 has been illustrated as roughly 45 degree angle(s) relative to the plane 103 for providing a pivot panel combination of dynamic panel portions 25 that extend roughly 45 degrees relative to the plane 105 of the static panel portion 24.

Preferably, the case construction 11 according to the present invention further comprises certain dynamic panel retention means for selectively retaining the dynamic panel portions 25 of the multi-layer, multi-section panel assembly 20 in engagement with the posterior panel-opposing section 16 for enabling the user to more easily position the device-holding cradle 14 in a flat display position relative to the support surface 100. In other words, the dynamic panel retention means operate to selectively hold the dynamic panel portions 25 in engagement with the posterior panel-opposing section 16 for enabling the user to lay the case construction 11 flat upon a surface 100.

It is contemplated that any number of temporary fastening means may be utilized to perform a dynamic panel retention function, such as hook and loop type fastening means or snap-together type fastening means. In the preferred embodiment, however, it is contemplated that the dynamic panel retention means may be exemplified by magnetic panel retention means for magnetically attracting (as at arrows 106) the dynamic panel portions 25 toward the posterior panel-opposing portion 16.

More particularly, the temporary panel-attachment portion 19 comprises at least a first cradle magnet 29 and a second cradle magnet 29 in quadrants adjacent the permanent panel-attachment portion 18. The first and second primary support panel portions 26 respectively comprise at least a first primary panel magnet or magnet layer and a second primary panel magnet or magnet layer as at 30. Together, the first and second cradle and primary panel magnets 29 and 30 are respectively cooperable for magnetically attracting (as at 106) the dynamic panel portions 25 toward the posterior panel-opposing portion 16.

Noting that the temporary panel-attachment portion 19 preferably further comprises at least a third cradle magnet 31 adjacent both the first and second cradle magnets 29, and the first secondary support panel portion comprises at least a first supplemental panel magnet as at 32, the third cradle and first supplemental panel magnets 31 and 32 are further respectively cooperable for magnetically attracting the dynamic panel portion 27 toward the posterior panel-opposing portion 16.

The second alternative embodiment or case construction 12 essentially differs from the case construction 11 by providing a multi-section panel assembly as at 33, which multi-section panel assembly 33 essentially comprises a unibody material construction with a plurality of panel portions 35 being interconnected by integrally formed, living hinges or flexure bearings as at 34. It will be recalled that multi-section panel assembly 20 comprises a plurality of panels as at panel portions 24 and 25 interconnected by a lower flexible, panel-connecting material layer 22.

The living hinges or flexure bearing structures 34, by contrast, may be made from the same material as the two panel portions 35 each of the hinges or flexure bearing structures 34 interconnects. Alternatively, hinges 64 may be used, which hinges are co-molded elastomer-polycarbonate hinges that operate to flexibly interconnect opposed polycarbonate panel portions as discussed in more detail in connection with alternative fourth and fifth case constructions 61 and 62 below.

Figure 28:
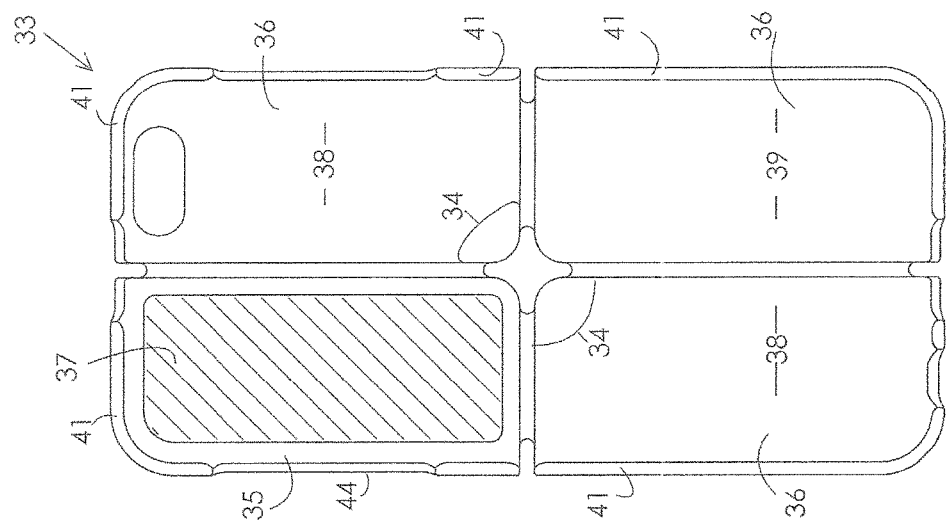
FIG. 28 is an anterior plan view of a second alternative multi-section panel assembly of a second alternative pivot panel case construction according to the present invention highlighting a static panel portion outfitted with an adhesive layer.
Figure 34:
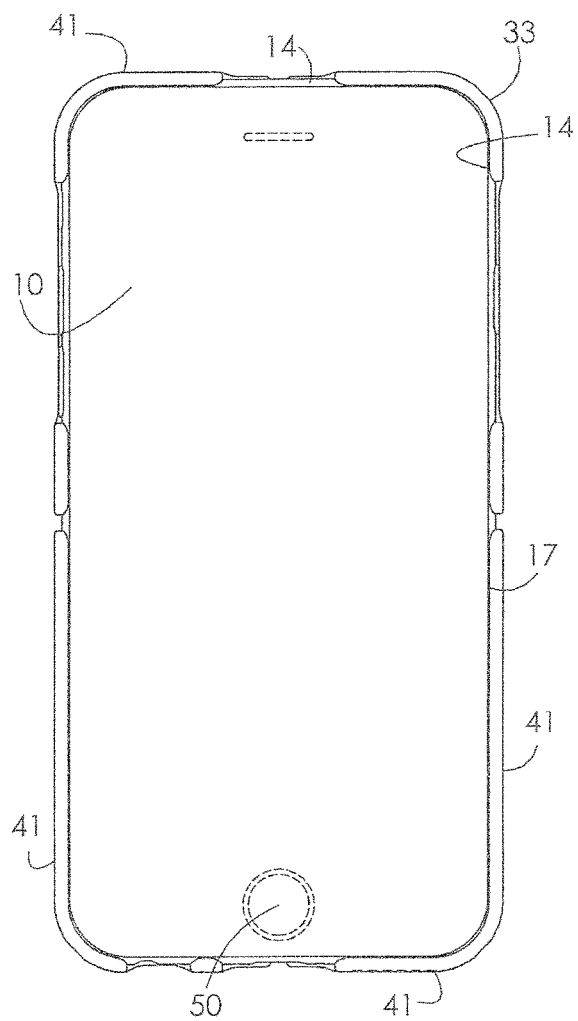
FIG. 34 is an anterior plan view of the second alternative pivot panel case construction according to the present invention with an electronic device received in the device-holding cradle.
Figure 35:
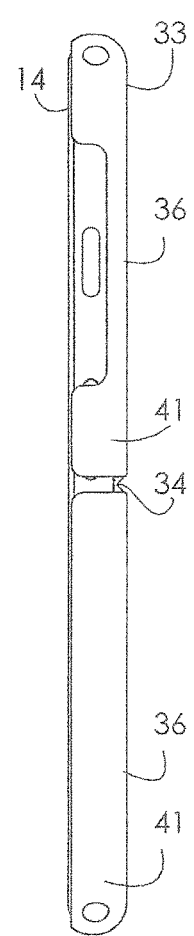
FIG. 35 is a lateral edge view of the second alternative pivot panel case construction according to the present invention with an electronic device received in the device-holding cradle.

Similar to multi-section panel assembly 20, multi-section panel assembly 33 preferably comprises a static panel portion as at 35 and three dynamic panel portions as at 36. The material construction at the static panel portion 35 may be permanently attached the permanent panel-attachment portion 18 of the device-holding cradle 14 for anchoring the static panel portion 35 thereto. Referencing FIG. 28, the reader will there note a depicted adhesive layer as at 37 (analogous to adhesive layer(s) 21) for adhesively anchoring the static panel portion 35 to the permanent panel-attachment portion 18 of the device-holding cradle 14.

Figure 36:
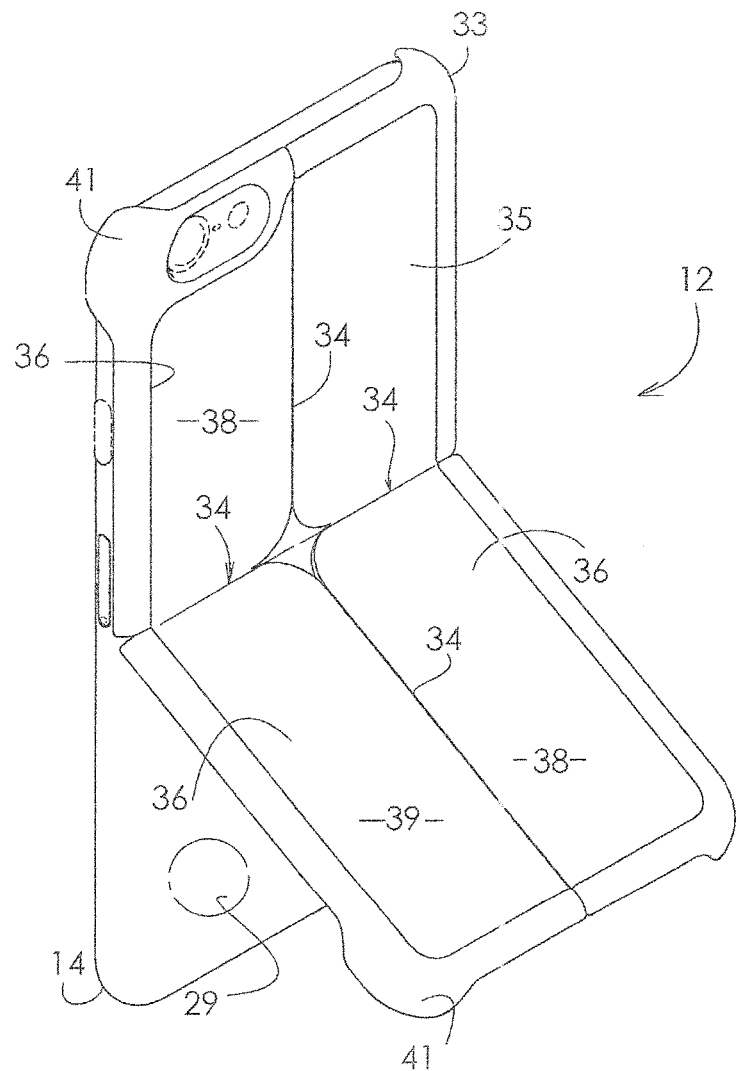
FIG. 36 is a first posterior perspective view of the second alternative pivot panel case construction according to the present invention shown in a first open, portrait orientation case configuration.
Figure 37:
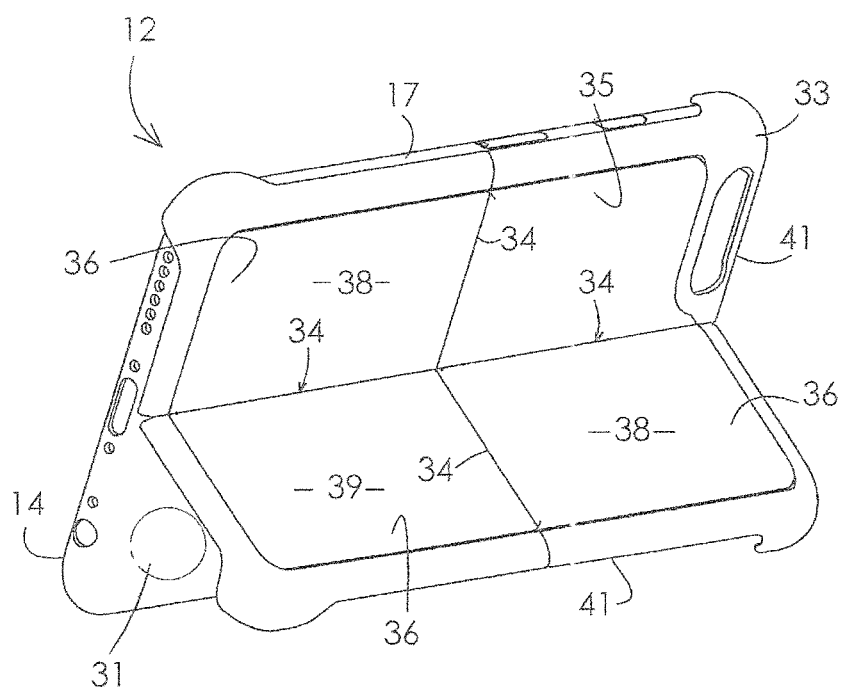
FIG. 37 is a second posterior perspective view of the second alternative pivot panel case construction according to the present invention shown in a second open, landscape orientation case configuration.
Figure 41:
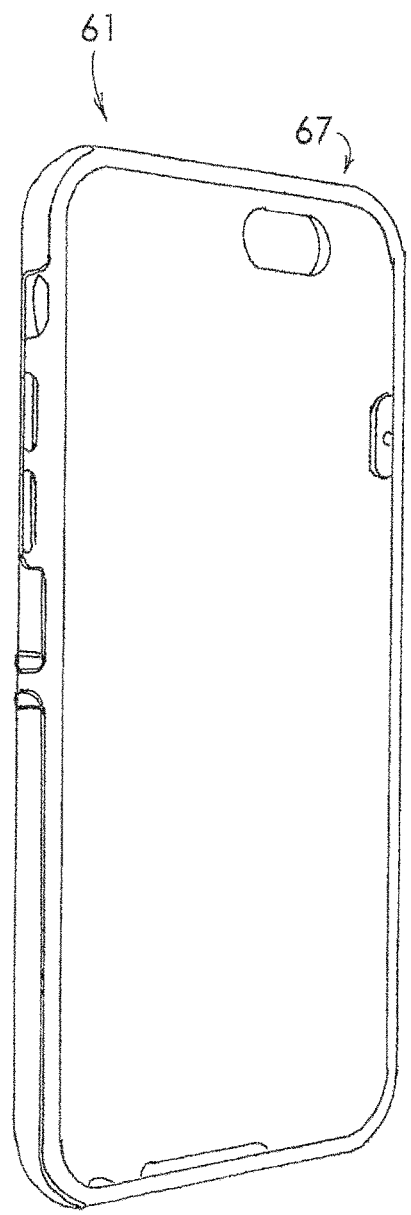
FIG. 41 is an anterior perspective view of a fourth alternative pivot panel case construction according to the present invention.
Figure 42:
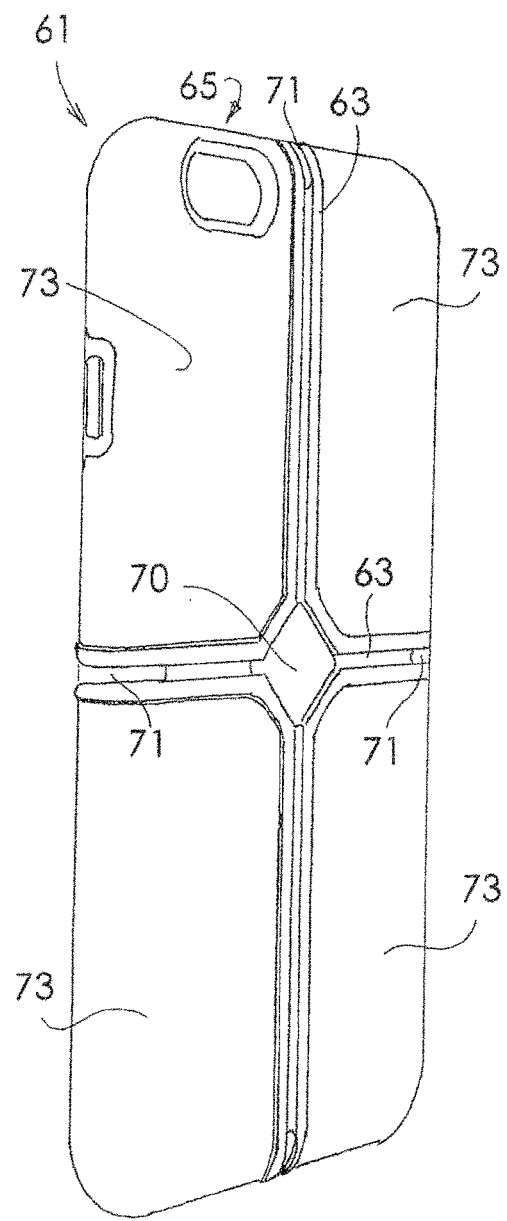
FIG. 42 is a first posterior perspective view of the fourth alternative pivot panel case construction according to the present invention.

Each of the four panel portions 35 and 36 are flexibly coupled to at least two other panel portions of the four panel portions via the living hinges or flexure bearing structures 34. A first primary support panel portion 38 and a second primary support panel portion 38 of the three dynamic panel portions 36 are pivotal relative to the static panel portion 35 about first and second pivot axes 101 and 102 for selectively supporting the device-holding cradle 14 in either a landscape orientation angled display position or a portrait orientation angled display position relative to a support surface 100. A portrait orientation angled display position is generally depicted in FIG. 36 and a landscape orientation angled display position is generally depicted in FIG. 37.

The first and second primary support panel portions 38 are those panel portions flexibly connected to the static panel portion 35 via living hinges or flexure bearing structures 34. A first secondary support panel portion 39 of the three dynamic panel portions 36 pivots in unison with either of the first or second primary support panel portions 38 for enhancing stabilized support of the device-holding cradle 14 in either of the angled display positions. The first secondary support panel portion 39 is flexibly connected to the first and second primary support panel portions 38 in diagonal relation to the static panel portion 35.

The first and second primary support panel portions 38 are preferably spaced from the static panel portion 35 at an upper surface plane 107 thereof such that opposed panel edging 40 of the static and dynamic panel portions 35 and 36 engage one another when in the angled display position for enhancing stabilized support of the device-holding cradle 14 when in the selected angled display position. Similarly, the first secondary support panel portion 39 is preferably spaced from the first and second primary support panel portions 38 such that opposed panel edging 40 of the dynamic panel portions 36 engage one another when in the angled display position for enhancing stabilized support of the device-holding cradle 14 in the selected angled display position.

The opposed panel edging 40 is thus similar in form and function to opposed panel edging 28 and is also preferably obliquely angled relative to the plane 107 of the outer panel surfacing of the multi-section panel assembly 33. As was the case with opposed panel edging 28, differing angles at opposed panel edging 40 will similarly operate to vary the display angle of the angled display position. The opposed panel edging 40 has been illustrated as roughly 45 degree angle(s) relative to the plane 107 for providing a pivot panel combination of panel portions 36 that extends roughly 45 degrees relative to the plane (as at 107) of the static panel portion 35.

Preferably, the case construction 12 according to the present invention further comprises certain dynamic panel retention means for selectively retaining the dynamic panel portions 36 of the multi-section panel assembly 33 in engagement with the posterior panel-opposing section 16 for enabling the user to more easily position the device-holding cradle 14 in a flat display position relative to the support surface 100. In other words, the dynamic panel retention means operate to selectively hold the panel portions 36 in engagement with the posterior panel-opposing section 16 for enabling the user to lay the case construction 12 flat upon a surface 100.

It is contemplated that any number of temporary fastening means may be utilized to perform a dynamic panel retention function, such as hook and loop type fastening means or snap-fit type fastening means. In case construction 12, it is contemplated that the dynamic panel retention means may be preferably exemplified by snap-fit, peripheral panel edging 41 formed to as to resiliently engage the peripheral cradle edging 17; and alternatively exemplified by magnetic dynamic panel retention means substantially as previously described for magnetically attracting the dynamic panel portions 36 toward the posterior panel-opposing portion 16.

With regard to the snap-fit, peripheral panel edging 41 formed to as to resiliently engage the peripheral cradle edging 17, it will be seen that the peripheral panel edging 41 is preferably formed so as to secondarily cradle the device-holding cradle 14 in much the same manner as the device-holding cradle 14 cradles the electronic device 10. In this regard, the multi-section panel assembly 33 may be said to provide a cradle jacket to the device-holding cradle 14, which cradle jacket operates to both protect the device-holding cradle 14 and also enable the user to prop or support the device-holding cradle 14 in either of the angled display positions.

With regard to the magnetic dynamic panel retention means, it is contemplated that the temporary panel-attachment portion 19 may alternatively comprise at least a first cradle magnet 29, a second cradle magnet 29, and a third cradle magnet 31 adjacent the permanent panel-attachment portion 18. The first and second primary support panel portions 38 and first secondary support panel portion 39 may alternatively and respectively comprise at least a first primary panel magnet or magnet layer and a second primary panel magnet or magnet layer as at 42. In this regard, it is contemplated that magnetic layer 42 is exemplified by a magnetic paint layer or a magnetic dust added to the inner superficial layer of the material construction of the multi-section panel assembly 33.

The third alternative embodiment or case construction 13 essentially differs from the case construction 12 by providing the multi-section panel assembly 33 without the peripheral panel edging 41, and thus in case construction 13, the magnetic dynamic panel retention means may be the preferred panel retention means substantially as previously described for magnetically attracting the dynamic panel portions 36 toward the posterior panel-opposing portion 16.

The panel assembly 33 of case construction essentially comprises a unibody material construction with a plurality of panel portions 35 being interconnected by living hinges or flexure bearing structures as at 34. The multi-section panel assembly 33 of case construction 13 also preferably comprises a static panel portion as at 35 and three dynamic panel portions as at 36. The material construction at the static panel portion 35 may be permanently attached the permanent panel-attachment portion 18 of the device-holding cradle 14 for anchoring the static panel portion 35 thereto.

Each of the four panel portions 35 and 36 are flexibly coupled to at least two other panel portions of the four panel portions via the living hinges or flexure bearing structures 34. A first primary support panel portion 38 and a second primary support panel portion 38 of the three dynamic panel portions 36 are pivotal relative to the static panel portion 35 about first and second pivot axes as at 101 and 102 for selectively supporting the device-holding cradle 14 in either a landscape orientation angled display position or a portrait orientation angled display position relative to a support surface 100.

The first and second primary support panel portions 38 are those panel portions flexibly connected to the static panel portion 35 via living hinges or flexure bearing structures 34. A first secondary support panel portion 39 of the three dynamic panel portions 36 pivots in unison with either of the first or second primary support panel portions 38 for enhancing stabilized support of the device-holding cradle 14 when in the selected angled display position. The first secondary support panel portion 39 is flexibly connected to the first and second primary support panel portions 38 in diagonal relation to the static panel portion 35.

The first primary support panel portion 38 and the second primary support panel portion 38 are preferably spaced from the static panel portion 35 at an upper surface plane 107 thereof such that opposed panel edging 40 of the static and dynamic panel portions 35 and 36 engage one another when in the selected angled display position for enhancing stabilized support of the device-holding cradle 14 in the angled display position. Similarly, the first secondary support panel portion 39 is preferably spaced from the first and second primary support panel portions 38 such that opposed panel edging 40 of the dynamic panel portions 36 engage one another when in the angled display position for enhancing stabilized support of the device-holding cradle 14 in the angled display position.

The opposed panel edging 40 is thus similar in form and function to opposed panel edging 28 and is also preferably obliquely angled relative to the plane 107 of the outer panel surfacing of the multi-section panel assembly 33. As was the case with opposed panel edging 28, differing angles at opposed panel edging 40 will similarly operate to vary the display angle of the angled display position. The opposed panel edging 40 has been illustrated as roughly 45 degree angle(s) relative to the plane 107 for providing a pivot panel combination of panel portions 36 that extends roughly 45 degrees relative to the plane (as at 107) of the static panel portion 35.

Fourth and fifth case constructions according to the present invention are further depicted in FIGS. 41-47. The fourth case construction 61 is generally depicted and referenced in FIGS. 41-46, and the fifth case construction 62 is generally depicted in FIG. 47. In both case constructions 61 and 62, co-molded elastomeric-polycarbonate flexure bearing or hinge structures 63 and 64 are exemplified and respectively and flexibly interconnect opposed polycarbonate panel portions of multi-section panel assemblies 65 and 66, which assemblies 65 and 66 cooperate with the device-holding cradles 67 and 68 respectively for selectively encasing and displaying an electronic device as at 10.

More particularly, case construction 61 preferably comprises a device-holding cradle as at 67 for removably receiving an electronic device 10, which device-holding cradle 67 is molded to comprise or include an anterior device-receiving section substantially identical to anterior device-receiving section 15 and a posterior panel-opposing section 69. It is contemplated that cradle 67 may be molded from a moldable material such as thermoplastic polyurethane. Posterior panel-opposing section 69 differs from posterior panel-opposing section 16 at least with the addition of (a) a hub member 70 extending rearwardly from the posterior panel-opposing section 69 and (b) a series of rib members 71 extending rearwardly from the posterior panel-opposing section 69.

In the case construction 61, the flexure bearing or hinge structure 63 of the multi-section panel assembly 65 provides a hub-receiving aperture as at 72. The hub member 71 extending rearwardly from the posterior panel-opposing section 68 is preferably of a rhombic or diamond shape such that the pivot axes provided by the hinge structure(s) 63 bisect the shape into equal triangular halves. Hub member 71 is thus received in a cooperatively shaped hub-receiving aperture 72 for enhancing attachment and positioned placement of the multi-section panel assembly 65 to the device-holding cradle 67.

Figure 43:
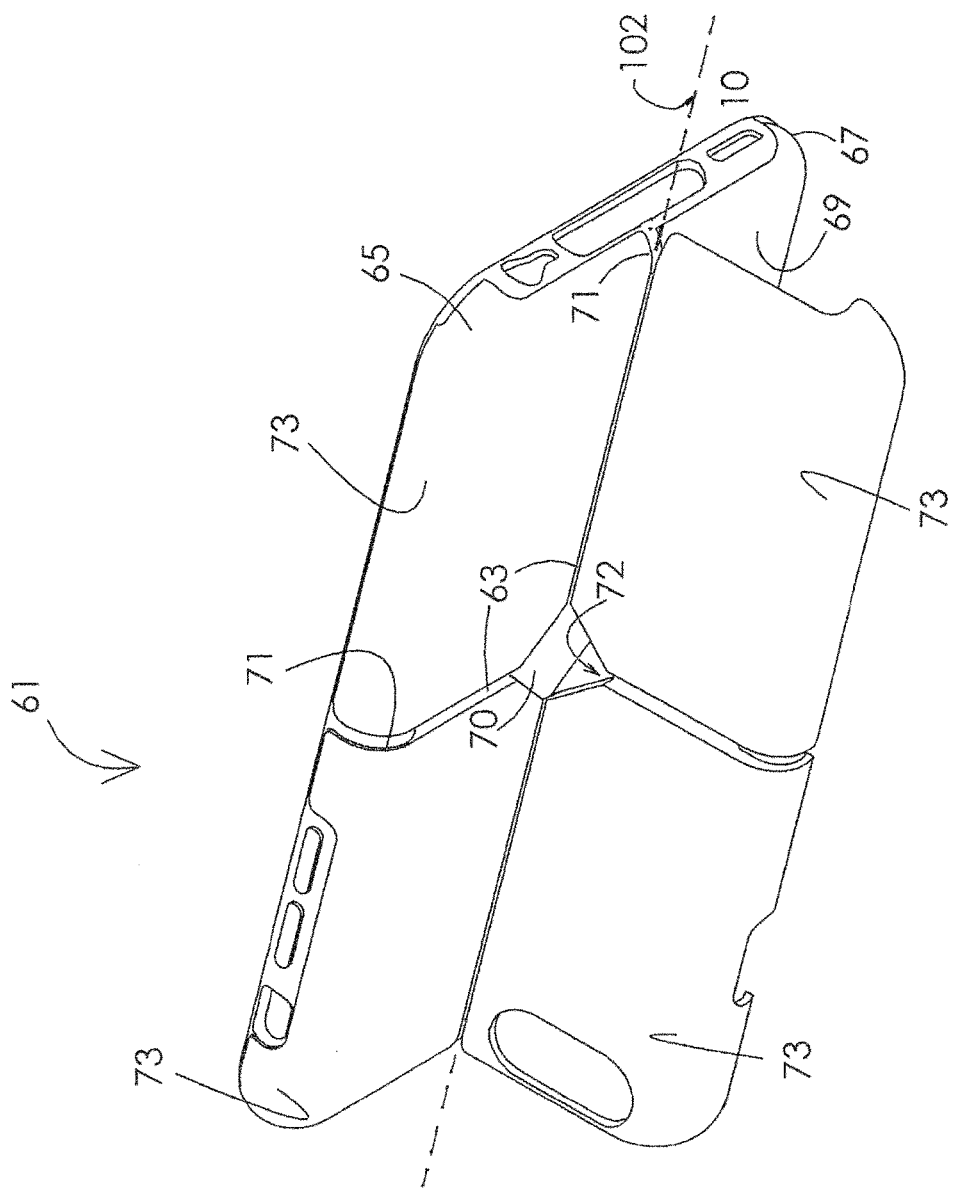
FIG. 43 is a second posterior perspective view of the fourth alternative pivot panel case construction according to the present invention shown in a first open, landscape orientation case configuration.
Figure 44:
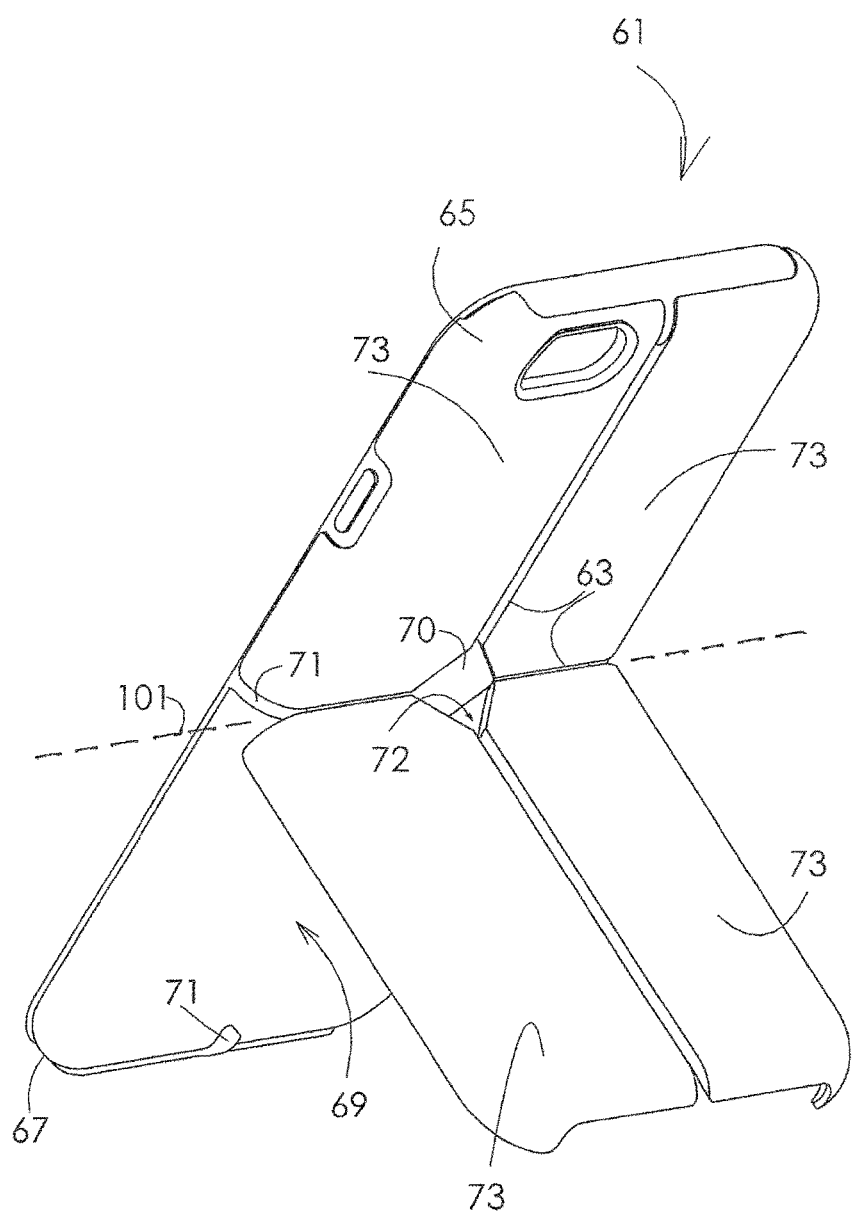
FIG. 44 is a third posterior perspective view of the fourth alternative pivot panel case construction according to the present invention shown in a second open, portrait orientation case configuration.
Figure 45:
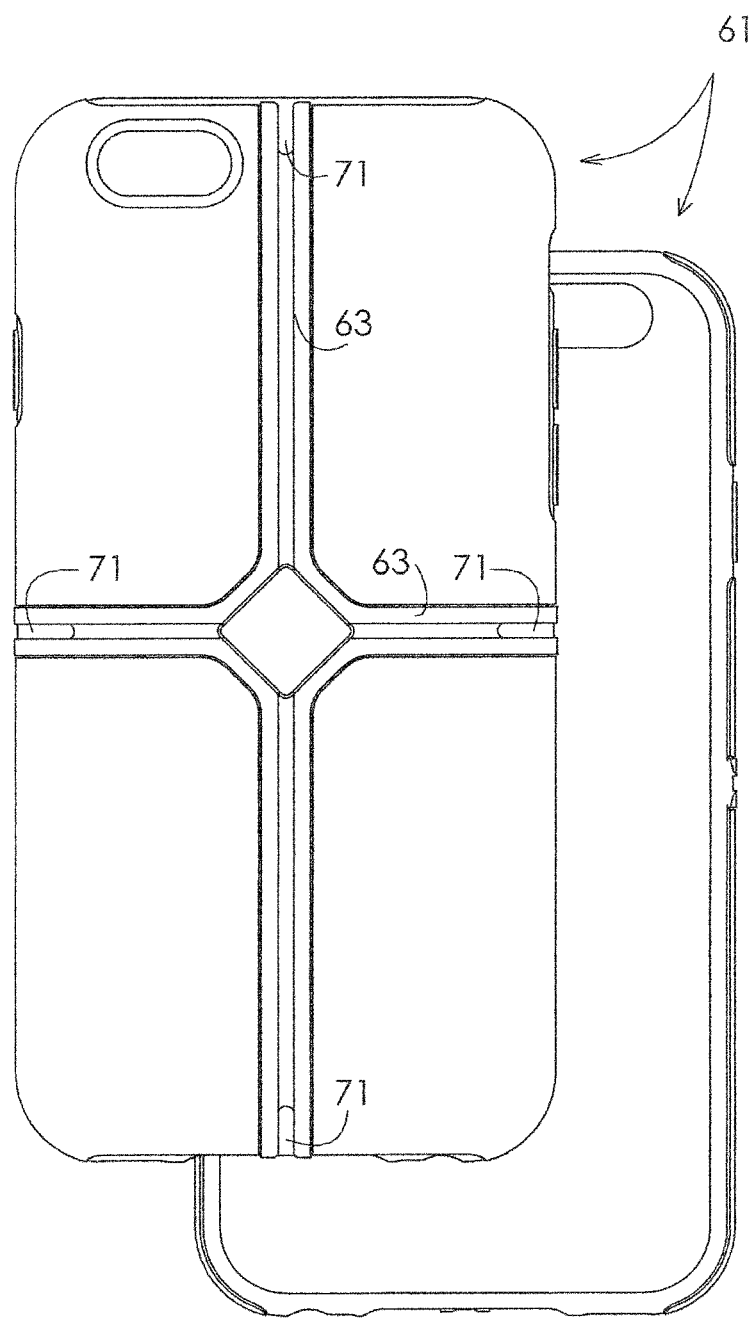
FIG. 45 is a dual posterior-anterior view of the fourth alternative pivot panel case construction according to the present invention with the posterior view being superimposed over the anterior view.

The multi-section panel assembly 65 preferably comprises a series of at least four panel portions as at 73, which four panel portions 73 are flexibly coupled to one another via the hinge or flexure bearing structure(s) 63. The assembly-to-cradle attachment mechanism defined, in part, by the cooperative association of the hub member 71 and hub-receiving aperture 72 operates to help attach the multi-section panel assembly 65 to the device-receiving cradle 67 such that a pair of panel portions from the four panel portions 73 are pivotal about a select one of two pivot axes as at 101 and 102 for supporting the device-holding cradle 67 in a select angled display position relative to a support surface. FIG. 43 depicts a landscape orientation angled display position and FIG. 44 depicts a portrait orientation angled display position.

The assembly-to-cradle attachment mechanism according to the present invention provides certain panel retention means and may be further exemplified by comprising a series of rib-receiving slots as at 74 formed in the multi-section panel assembly 65. In this regard, the rib members 71 are receivable in the rib-receiving slots 74 for also enhancing attachment and positioned placement of the multi-section panel assembly 65 relative to the device-holding cradle 67. Notably, the four panel portions 73 are hingedly and flexibly interconnected via the flexure bearing or hinge structure(s) 63, which flexure bearing or hinge structure(s) 63 are preferably abbreviated in length relative to the corresponding length of opposed panel portions 73 hingedly and flexibly interconnected thereby for forming the rib-receiving slots 74.

With regard to case construction 62, the reader will note that the construction 62 preferably comprises a device-holding cradle as at 68 for removably receiving an electronic device 10, which device-holding cradle 68 comprises or includes an anterior device-receiving section substantially identical to anterior device-receiving section 15 and a posterior panel-opposing section 75. It is contemplated that cradle 68 may also be molded from a moldable material such as thermoplastic polyurethane. Posterior panel-opposing section 75 differs from posterior panel-opposing section 16 at least with the addition of certain matable male and/or female structures for mating with corresponding structures formed on the multi-section panel assembly 66 usable in combination therewith to form case construction 62.

In the case construction 62, the flexure bearing or hinge structure(s) 64 of the multi-section panel assembly 66 eliminates the hub-receiving aperture otherwise associated with assembly 65. The multi-section panel assembly 66 does comprise or include a series of at least four panel portions as at 76, which four panel portions 76 are flexibly coupled to one another via the hinge structure(s) 64. The assembly-to-cradle attachment mechanism of case construction 62 is defined, in part, by the cooperative association of the matable elements formed on the assembly 66 and the cradle 68.

In this regard, the four panel portions 76 comprise a static panel portion as at 77 and three dynamic panel portions as at 78. The static panel portion 77 is preferably anchored to a permanent panel-attachment portion 79 of the posterior panel-opposing section 75 via the assembly-to-cradle attachment mechanism defined by these matable structures. Thus, a first primary support panel portion and a second primary support panel portion of the three dynamic panel portions are pivotal relative to the static panel portion 77 about the first and second pivot axes 101 and 102 for selectively supporting the device-holding cradle 68 in the select angled display position relative to a support surface.

As indicated, the assembly-to-cradle attachment mechanism comprises a series of cooperative male/female structures formed on the static panel portion 77 and the permanent panel-attachment portion 79. The cooperative male/female structures are cooperable to attach the multi-section panel assembly 66 to the device-holding cradle 68. It is contemplate, for example, that the static panel portion 77 may preferably comprise a series of tongue-like protuberances as at 80, which protuberances 80 are insertable into groove-like female receptacles as at 81. Further, a pin-like structure 82 formed on the static panel portion 77 is receivable in a pin-receiving hole 83 formed on the permanent panel-attachment portion 79.

The assembly-to-cradle attachment mechanism according to case construction 62 may also be further exemplified by comprising a series of rib-receiving slots as at 74 formed in the multi-section panel assembly 66. In this regard, the rib members 71 may also be formed on the cradle 68 and made receivable in the rib-receiving slots 74 for further enhancing attachment and positioned placement of the multi-section panel assembly 66 relative to the device-holding cradle 68.

While the above descriptions contain much specificity, this specificity should not be construed as limitations on the scope of the invention, but rather as an exemplification of the invention. The basic invention may be said to essentially teach or disclose a case construction for selectively encasing or displaying an electronic device such as a smart phone or tablet computer as exemplified by case constructions 11, 12, 13, 61, and 62 respectively. The case constructions 11, 12, and 13 each preferably and essentially comprise a device-holding cradle as at 14 and a multi-section panel assembly as at 20 or 33.

The device-holding cradle 14 is sized and shaped to removably receive an electronic device 10 and preferably and essentially comprises an anterior device-receiving section 15, a posterior panel-opposing section 16, and a peripheral cradle edging 17. The posterior panel-opposing section 16 comprises or includes a permanent panel-attachment portion as at 18 and a temporary panel-attachment portion as at 19. The multi-section panel assemblies each comprise at least four panel portions including a static panel portion as at 24 or 35, and at least three dynamic panel portions as at 25 or 36.

The static panel portion of either multi-section panel assembly is anchored to the permanent panel-attachment portion of the device-holding cradle such that each of the at least four panel portions of the multi-section panel assembly is flexibly coupled to at least two other panel portions. A first primary support panel portion and a second primary support panel portion of the three dynamic panel portions are each being pivotal relative to the static panel portion about first and second pivot axes for selectively supporting the device-holding cradle in an angled display position (either landscape or portrait orientation) relative to a support surface.

The four panel portions may be either hingedly and flexibly interconnected via integrally formed, living hinges or flexure bearings as at 34 as in case constructions 12 and 13 or via a flexible material layer as at 22 as in case construction 11. In case construction 12, the multi-section panel assembly 33 may preferably comprise peripheral panel edging as at 41, which peripheral panel edging 41 is configured or sized and shaped to resiliently engage or receive the peripheral cradle edging 17 of the device-holding cradle 14. The multi-section panel assembly 33 of case construction 12 thereby provides a cradle jacket for jacketing posterior and edge portions of the device-holding cradle 14.

In case construction 11, the multi-section panel assembly 20 is preferably multi-layered thereby providing a multi-layer, multi-section panel assembly. The multi-layer, multi-section panel assembly 20 comprises an inner or lower flexible material layer as at 22, which flexible material layer 22 is permanently attached to (a) each of the at least four panel portions of the panel assembly 20 and (b) the permanent panel-attachment portion of the posterior panel-opposing section 16 of the device-holding cradle 14 for anchoring the static panel portion 25 of the multi-section panel assembly 20 thereto.

Figure 16:
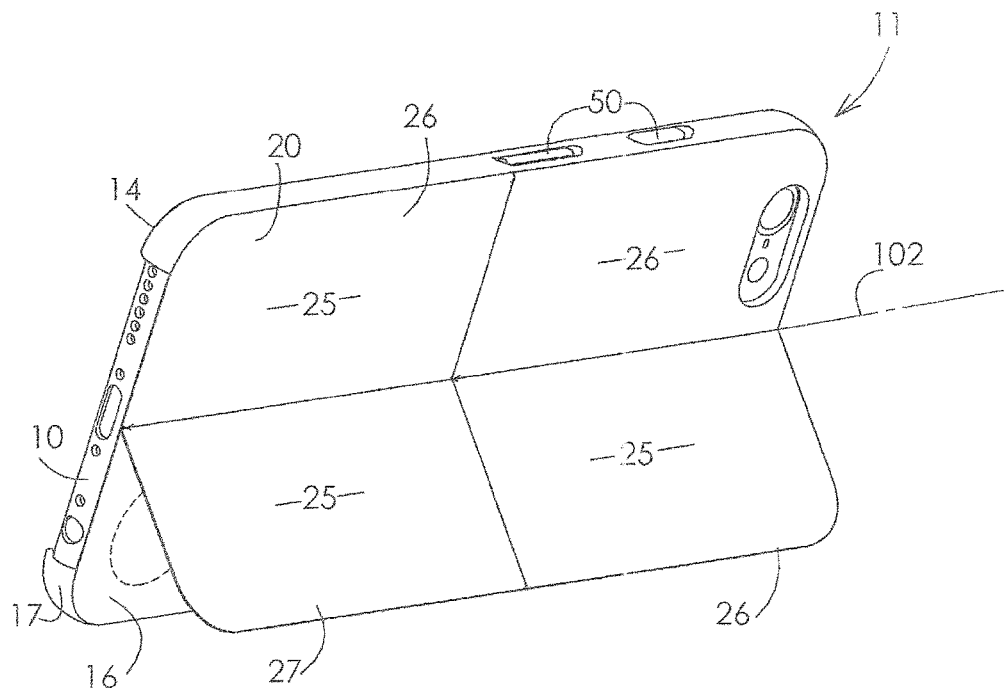
FIG. 16 is a fourth top posterior perspective view of the first alternative pivot panel case construction according to the present invention with an electronic device received in the device-holding cradle and shown in a landscape orientation open-pivot configuration.
Figure 17:
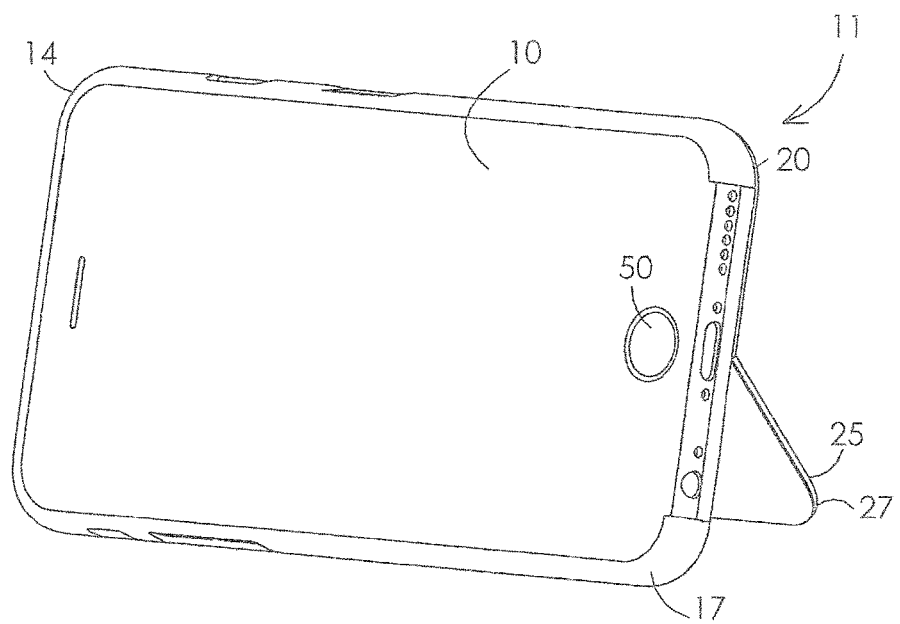
FIG. 17 is a fourth top anterior perspective view of the first alternative pivot panel case construction according to the present invention with an electronic device received in the device-holding cradle and shown in a landscape orientation open-pivot configuration.
Figures 18, 19:
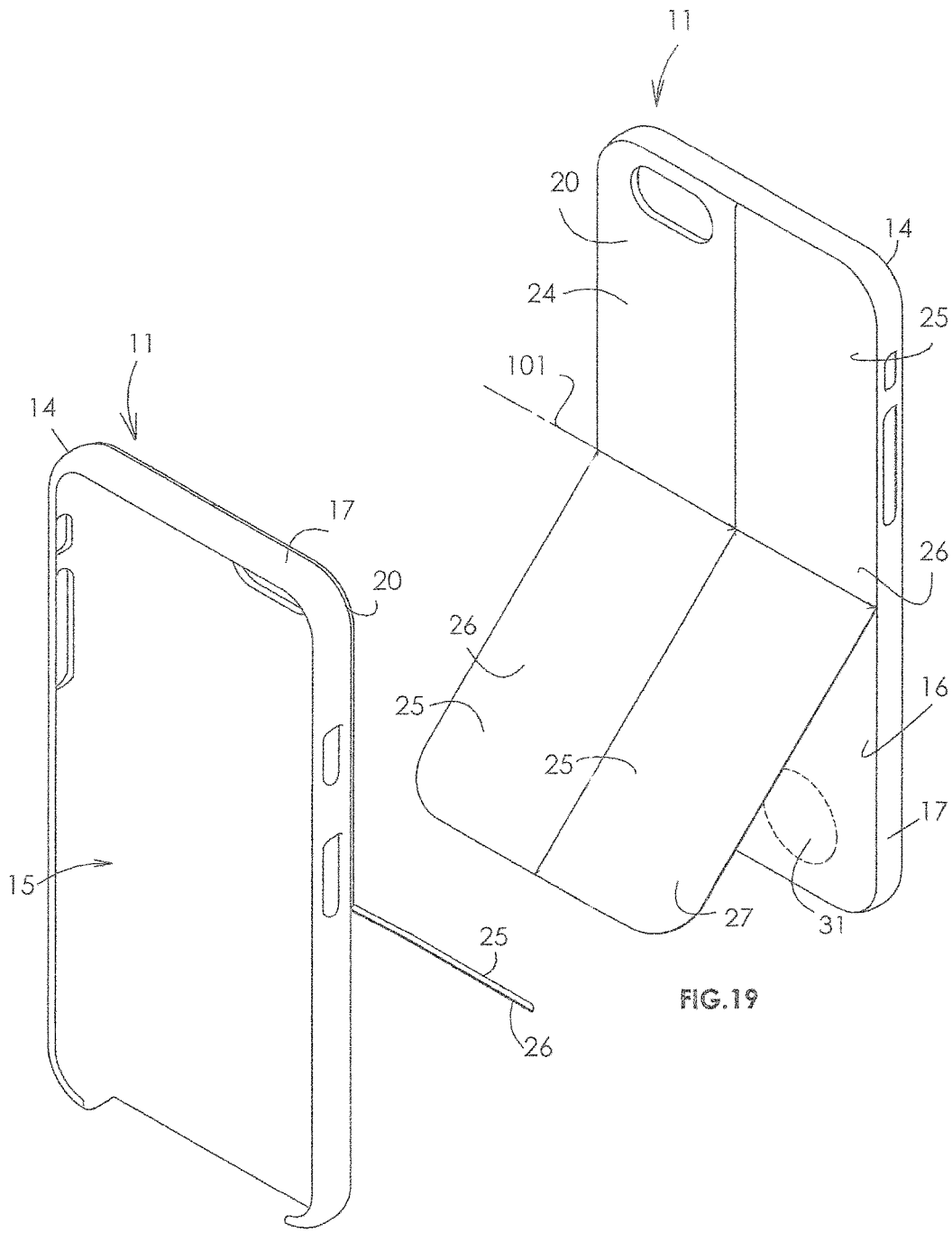
FIG. 18 is a fifth top anterior perspective view of the first alternative pivot panel case construction according to the present invention shown in a portrait orientation open-pivot configuration.
FIG. 19 is a fifth top posterior perspective view of the first alternative pivot panel case construction according to the present invention shown in a portrait orientation open-pivot configuration.
Figure 27:
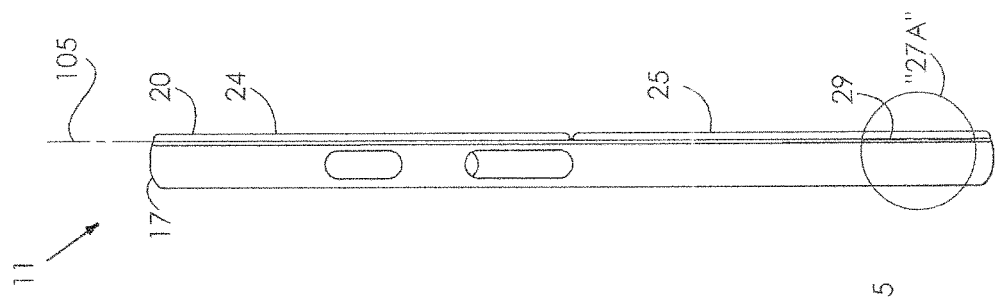
FIG. 27 is a lateral edge view of the first alternative pivot panel case construction according to the present invention shown in a closed configuration with a magnet shown in hidden or broken lines to depict how the magnet holds the panel assembly in engagement therewith.

A first and a second primary support panel portion as at 26 or 38 of the three dynamic panel portions (25 or 36) are each pivotal relative to the static panel portions 24 or 35 about first and second pivot axes for selectively supporting the device-holding cradle 14 in an angled display position relative to a support surface as at 100. The angled display position may be either a landscape type orientation as generally depicted in FIGS. 16 and 17 or a portrait type orientation as generally depicted in FIGS. 18 and 19.

A first secondary support panel portion as at either 27 or 39 of the three dynamic panel portions diagonally opposite the static panel portions 24 or 35 pivots in unison with either of the first primary support panel portion or the second primary support panel portion for enhancing stabilized support of the device-holding cradle 14 in the angled display position depending on whether the angled display position is either of the landscape type orientation or portrait type orientation.

The first and second primary support panel portions are spaced from the static panel portion such that opposed panel edging of the static and dynamic panel portions engage one another when in the angled display position for enhancing stabilized support of the device-holding cradle in the angled display position. In keeping with this structural feature, the first secondary support panel portion is also spaced from both the first and second primary support panel portions such that opposed panel edging of the dynamic panel portions engage one another when in the angled display position for enhancing stabilized support of the device-holding cradle in the angled display position.

The opposed panel edging is preferably obliquely angled relative to outer panel surfacing of the multi-section panel assemblies such that the obliquely angled opposed panel edging operates to fix a display angle of the angled display position relative to the support surface. When the case construction is not in the angled display position, the case may be placed in a prone or flat display position. The case constructions according to the present invention may thus comprise certain dynamic panel retention means for selectively retaining the multi-section panel assembly in engagement with the posterior panel-opposing section for positioning the device-holding cradle in a flat display position relative to the support surface.

The (dynamic) panel retention means are variously exemplified and may be defined by either comprising certain magnetic means for magnetically attracting the dynamic panel portions toward the posterior panel-opposing portion or by comprising certain peripheral panel edging that resiliently engages or cooperates with the peripheral cradle edging of the device-holding cradle to retain the panels of the multi-section panel assembly in parallel relation to the posterior panel-opposing portion.

In the variously outfitted case constructions with magnetic panel retention means, the temporary panel-attachment portion may preferably comprise or include at least a first cradle magnet and a second cradle magnet adjacent the permanent panel-attachment portion. Further, the first and second primary support panel portions respectively comprise at least a first primary panel magnet and a second primary panel magnet.

The first cradle and primary panel magnets and the second cradle and primary panel magnets are respectively cooperable for magnetically attracting the dynamic panel portions toward the posterior panel-opposing portion. The temporary panel-attachment portion may further comprises at least a third cradle magnet adjacent both the first and second cradle magnets, and the first secondary support panel portion may comprise at least a first supplemental panel magnet. The third cradle and first supplemental panel magnets are respectively cooperable for magnetically attracting the dynamic panel portions toward the posterior panel-opposing portion.

Stated another way, the case constructions according to the present invention operate or function to selectively encase and display an electronic device such as a mobile phone or tablet type computer, and essentially and preferably comprise, include or provide a device-holding cradle and a multi-section panel assembly. The device-holding cradle is of fixed size and shape to removably receive the electronic device, and comprises or includes an anterior device-receiving section and a posterior panel-opposing section. The posterior panel-opposing section has a panel-attachment portion and a panel-seat section or portion (i.e. that portion of where pivotal panels may temporarily seat upon the posterior panel-opposing sections).

The multi-section panel assembly comprises or includes four panel portions, which four panel portions include a static panel portion and three dynamic panel portions. The static panel portion is anchored to the permanent panel-attachment portion, and the four panel portions are coupled to one another such that a first primary support panel portion and a second primary support panel portion of the three dynamic panel portions are pivotal relative to the static panel portion about first and second pivot axes for selectively supporting the device-holding cradle in an angled display position relative to a support surface.

When viewed from a further perspective, the case constructions according to the present invention may all be said to comprise a device-holding cradle as variously exemplified; a multi-section panel assembly as variously exemplified; and an assembly-to-cradle attachment mechanism as variously exemplified. The device-holding cradle basically operates to removably receive an electronic device and comprises or provides an anterior device-receiving section and a posterior panel-opposing section.

The multi-section panel assembly basically or essentially comprises four panel portions or sections, all of which are flexibly coupled to one another. The assembly-to-cradle attachment mechanism operates to attach the multi-section panel assembly to the device-receiving cradle such that a pair of panel portions from the four panel portions are pivotal about a select one of two pivot axes for supporting the device-holding cradle in a select angled display position relative to a support surface.

The assembly-to-cradle attachment mechanism may comprise or include a hub member extending rearwardly from the posterior panel-opposing section and a corresponding hub-receiving aperture may be formed in the multi-section panel assembly. The hub member of the posterior panel-opposing section is thus receivable in the hub-receiving aperture of the multi-section panel assembly for enhancing attachment and positioned placement of the multi-section panel assembly to the device-holding cradle.

The assembly-to-cradle attachment mechanism may further comprise a series of rib members extending rearwardly from the posterior panel-opposing section with corresponding rib-receiving slots formed in the multi-section panel assembly. In this regard, the rib members are receivable in the rib-receiving slots for enhancing attachment and positioned placement of the multi-section panel assembly to the device-holding cradle. Noting that the four panel portions are hingedly and flexibly interconnected via flexure bearings, it is further noted that the flexure bearings may be abbreviated in length relative to opposed panel portions hingedly and flexibly interconnected via the flexure bearings for forming the rib-receiving slots.

The four panel portions may preferably comprise a static panel portion and three dynamic panel portions such that the static panel portion is anchored to a permanent panel-attachment portion of the posterior panel-opposing section via the assembly-to-cradle attachment mechanism. A first primary support panel portion and a second primary support panel portion of the three dynamic panel portions are pivotal relative to the static panel portion about the first and second pivot axes for selectively supporting the device-holding cradle in the select angled display position relative to a support surface.

The assembly-to-cradle attachment mechanism may comprise a series of cooperative male/female structures formed on the static panel portion and the permanent panel-attachment portion such that the male/female structures are made cooperable or are matable to attach the multi-section panel assembly to the device-holding cradle. Other assembly-to-cradle attachment mechanisms or panel retention means may be exemplified by hook and loop fastening structures, adhesives, snap-fit structures and cooperable magnetic structures for selectively retaining the multi-section panel assembly in engagement with the posterior panel-opposing section for positioning the device-holding cradle in a flat display position relative to the support surface.

Accordingly, although the inventive pivoting panel case construction has been described by reference to a number of embodiments, it is not intended that the novel grooved case construction be limited thereby, but that modifications thereof are intended to be included as falling within the broad scope and spirit of the foregoing disclosure, the following claims, and the appended drawings.

What is claimed is:

1. A case construction for selectively encasing and displaying an electronic device, the case construction comprising:
    a device-holding cradle, the device-holding cradle being sized and shaped to removably receive an electronic device, the device-holding cradle comprising an anterior device-receiving section and a posterior panel-opposing section, the posterior panel-opposing section comprising a permanent panel-attachment portion and a temporary panel-attachment portion; and
    a multi-layer, multi-section panel assembly, the multi-layer, multi-section panel assembly comprising an inner flexible material layer and an outer load-supportive material layer, the load-supportive material layer being attached to the flexible material layer and comprising at least four panel portions, the at least four panel portions comprising a static panel portion and at least three dynamic panel portions, the flexible material layer being permanently attached to (a) each of the at least four panel portions and (b) the permanent panel-attachment portion for anchoring the static panel portion thereto, each of the at least four panel portions being flexibly coupled to at least two other panel portions of the at least four panel portions via the flexible material layer;
    a first primary support panel portion and a second primary support panel portion of the three dynamic panel portions each being pivotal relative to the static panel portion about first and second pivot axes for selectively supporting the device-holding cradle in either a landscape orientation angled display position or a portrait orientation angled display position relative to a support surface.

2. The case construction of claim 1 wherein a first secondary support panel portion of the three dynamic panel portions pivots in unison with either of the first primary support panel portion or the second primary support panel portion for enhancing stabilized support of the device-holding cradle in either the landscape orientation angled display position or the portrait orientation angled display position.

3. The case construction of claim 2 wherein the first primary support panel portion and the second primary support panel portion are spaced from the static panel portion such that opposed panel edging of the static and dynamic panel portions engage one another when in either the landscape orientation angled display position or the portrait orientation angled display position for enhancing stabilized support of the device-holding cradle in said angled display positions.

4. The case construction of claim 3 wherein the first secondary support panel portion is spaced from the first primary support panel portion and the second primary support panel portion such that opposed panel edging of the dynamic panel portions engage one another when in either the landscape orientation angled display position or the portrait orientation angled display position for enhancing stabilized support of the device-holding cradle in said angled display positions.

5. The case construction of claim 3 wherein the opposed panel edging is angled relative to an outer panel surfacing of the multi-layer, multi-section panel assembly, the led opposed panel edging for fixing a display angle of either the landscape orientation angled display position or the portrait orientation angled display position relative to the support surface.

6. The case construction of claim 1 comprising dynamic panel retention means for selectively retaining the multi-layer, multi-section panel assembly in engagement with the posterior panel-opposing section for positioning the device-holding cradle in a flat display position relative to the support surface.

7. The case construction of claim 6 wherein the dynamic panel retention means comprise magnetic means for magnetically attracting the dynamic panel portions toward the posterior panel-opposing portion, the temporary panel-attachment portion comprising at least a first cradle magnet and a second cradle magnet adjacent the permanent panel-attachment portion, and the first primary support panel portion and the second primary support panel portion respectively comprise at least a first primary panel magnet and a second primary panel magnet, the first cradle and primary panel magnets and the second cradle and primary panel magnets being respectively cooperable for magnetically attracting the dynamic panel portions toward the posterior panel-opposing portion.

8. The case construction of claim 7 wherein the temporary panel-attachment portion comprises at least a third cradle magnet adjacent both the first and second cradle magnets, and the first secondary support panel portion comprises at least a first supplemental panel magnet, the third cradle and first supplemental panel magnets being respectively cooperable for magnetically attracting the dynamic panel portions toward the posterior panel-opposing portion.

9. A case construction for selectively encasing and displaying an electronic device, the case construction comprising:
    a device-holding cradle, the device-holding cradle being sized and shaped to removably receive an electronic device, the device-holding cradle comprising an anterior device-receiving section and a posterior panel-opposing section, the posterior panel-opposing section comprising a panel-attachment portion and a panel-seat portion; and a multi-section panel assembly, the multi-section panel assembly comprising at least four panel portions, the at least four panel portions comprising a static panel portion and at least three dynamic panel portions, the static panel portion being anchored to the panel-attachment portion, each of the at least four panel portions being flexibly coupled to at least two other panel portions of the at least four panel portions;

a first and a second primary support panel portion of the three dynamic panel portions each being pivotal relative to the static panel portion about first and second pivot axes for selectively supporting the device-holding cradle in an angled display position relative to a support surface.

10. The case construction of claim 9 wherein the at least four panel portions are flexibly interconnected via flexure bearing structures.

11. The case construction of claim 9 wherein the multi-section panel assembly comprises peripheral panel edging, the peripheral panel edging being configured to receive peripheral cradle edging formed on the device-holding cradle, the multi-section panel assembly thereby providing a cradle jacket for jacketing posterior and edge portions of the device-holding cradle.

12. The case construction of claim 9 wherein the multi-section panel assembly is multi-layered thereby providing a multi-layer, multi-section panel assembly, the multi-layer, multi-section panel assembly comprising an inner flexible material, the flexible material layer being permanently attached to each of the at least four panel portions and the panel-attachment portion for anchoring the static panel portion thereto.

13. The case construction of claim 9 wherein a first secondary support panel portion of the three dynamic panel portions pivots in unison with either of the first primary support panel portion or the second primary support panel portion for enhancing stabilized support of the device-holding cradle in the angled display position.

14. The case construction of claim 13 wherein the first and second primary support panel portions are spaced from the static panel portion such that opposed panel edging of the static and dynamic panel portions engage one another when in the angled display position for enhancing stabilized support of the device-holding cradle in the angled display position.

15. The case construction of claim 9 comprising panel retention means for selectively retaining the multi-section panel assembly in engagement with the posterior panel-opposing section for positioning the device-holding cradle in a flat display position relative to the support surface.

16. A case construction for selectively encasing and displaying an electronic device, the case construction comprising:

a device-holding cradle for removably receiving an electronic device, the device-holding cradle comprising an anterior device-receiving section and a posterior panel-opposing section, the posterior panel-opposing section comprising a hub member extending rearwardly therefrom; and a multi-section panel assembly, the multi-section panel assembly comprising four panel portions and a hub-receiving aperture formed centrally relative to the four panel portions, the four panel portions being flexibly coupled to one another and comprising a static panel portion and three dynamic panel portions, the static panel portion being attached to a permanent panel-attachment portion of the posterior panel-opposing section;

the hub member being receivable in the hub-receiving aperture for enhancing attachment and positioned placement of the multi-section panel assembly to the device-holding cradle, a pair of panel portions from the three dynamic panel portions being pivotal about a select one of two pivot axes for supporting the device-holding cradle in a select angled display position relative to a support surface.

17. The case construction of claim 16 comprising a series of rib members extending rearwardly from the posterior panel-opposing section and a series of rib-receiving slots formed in the multi-section panel assembly, the rib members being received in the rib-receiving slots for enhancing attachment and positioned placement of the multi-section panel assembly to the device-holding cradle.

18. The case construction of claim 17 wherein the four panel portions are hingedly and flexibly interconnected via flexure bearing structures, the flexure bearing structures being abbreviated in length relative to opposed panel portions hingedly and flexibly interconnected via said flexure bearing structures for forming the rib-receiving slots.

* * * * *